(12) United States Patent
Konishi et al.

(10) Patent No.: US 10,907,681 B2
(45) Date of Patent: Feb. 2, 2021

(54) PAD BEARING AND ROTARY MACHINE

(71) Applicant: MITSUBISHI HEAVY INDUSTRIES, LTD., Tokyo (JP)

(72) Inventors: Eiji Konishi, Tokyo (JP); Shimpei Yokoyama, Tokyo (JP); Chihiro Yoshimine, Tokyo (JP); Tadasuke Nishioka, Tokyo (JP); Shuichi Isayama, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 16/292,688

(22) Filed: Mar. 5, 2019

(65) Prior Publication Data

US 2019/0277338 A1    Sep. 12, 2019

(30) Foreign Application Priority Data

Mar. 9, 2018  (JP) .................................. 2018-043500

(51) Int. Cl.
*F16C 17/03*   (2006.01)
*F16C 33/10*   (2006.01)
*F16N 1/00*    (2006.01)

(52) U.S. Cl.
CPC ............ *F16C 17/03* (2013.01); *F16C 33/108* (2013.01); *F16C 33/1085* (2013.01); *F16N 1/00* (2013.01); *F16C 2360/22* (2013.01); *F16C 2360/23* (2013.01); *F16N 2210/14* (2013.01)

(58) Field of Classification Search
CPC .... F16C 17/03; F16C 33/1045; F16C 33/106; F16C 33/108; F16C 33/1085; F16N 2210/14
See application file for complete search history.

(56) References Cited

U.S. PATENT DOCUMENTS

| 4,291,926 A | * | 9/1981 | Tonnioka | ................ F16C 17/03 384/311 |
| 5,738,447 A | | 4/1998 | Nicholas | |
| 7,237,957 B2 | | 7/2007 | Geiger | |
| 7,758,247 B2 | * | 7/2010 | Geiger | ................ F16C 17/03 384/309 |
| 9,746,024 B2 | * | 8/2017 | Sato | ................ F16C 33/1045 |
| 2006/0193543 A1 | | 8/2006 | Geiger | |

(Continued)

FOREIGN PATENT DOCUMENTS

| JP | 49-077334 | 10/1974 |
| JP | 57-195914 | 12/1982 |
| JP | 58-038036 | 3/1983 |

(Continued)

*Primary Examiner* — James Pilkington
(74) *Attorney, Agent, or Firm* — Wenderoth, Lind & Ponack, L.L.P.

(57) ABSTRACT

A pad bearing includes a pad disposed on a radially outer side of a rotary shaft and supporting the rotary shaft so as to be rotatable around an axis, a block-shaped nozzle member disposed on an upstream side with respect to the pad on the radially outer side of the rotary shaft and including a discharge hole for discharging a lubricant toward an outer peripheral surface of the rotary shaft, and a compressed flow forming unit disposed in at least one of the pad and the nozzle member and configured to compress a flow of the lubricant flowing along the outer peripheral surface of the rotary shaft as the rotary shaft rotates.

3 Claims, 11 Drawing Sheets

(56) References Cited

U.S. PATENT DOCUMENTS

2014/0205224 A1 7/2014 Hemmi et al.
2016/0169274 A1 6/2016 Sato et al.

FOREIGN PATENT DOCUMENTS

| JP | 58-180815 | 10/1983 |
| JP | 10-246225 | 9/1998 |
| JP | 2000-274432 | 10/2000 |
| JP | 2001-020952 | 1/2001 |
| JP | 2004-197890 | 7/2004 |
| JP | 3637187 | 4/2005 |
| JP | 2008-101750 | 5/2008 |
| JP | 2010-151283 | 7/2010 |
| JP | 2016-109268 | 6/2016 |
| JP | 2016-145588 | 8/2016 |
| WO | 2012/175068 | 12/2012 |
| WO | 2013/046404 | 4/2013 |
| WO | 2018/029834 | 2/2018 |

* cited by examiner

PAD BEARING AND ROTARY MACHINE

BACKGROUND OF THE INVENTION

Field of the Invention

The present invention relates to a pad bearing and a rotary machine.

Priority is claimed on Japanese Patent Application No. 2018-043500, filed on Mar. 9, 2018, the content of which is incorporated herein by reference.

Description of Related Art

In a rotary machine that has a rotary shaft, examples of which include a steam turbine, a gas turbine, a pump, and an engine, a bearing is used so that the rotary shaft is rotatably supported.

In many cases, a lubricant is supplied between a sliding contact surface of the bearing and the rotary shaft for the purpose of, for example, a decrease in frictional resistance between the rotary shaft and the bearing and damping of rotary shaft vibration.

For example, Patent Document 1 discloses a pad bearing as a bearing that has a sliding contact surface which is in sliding contact with a rotary shaft. This pad bearing is provided with a lubricant supply bar (hereinafter, referred to as a nozzle member) supplying a lubricant between the rotary shaft and the sliding contact surface of a pad (shoe). The nozzle member is disposed in front of the pad in the rotation direction of the rotary shaft. The nozzle member has a block shape (rectangular parallelepiped shape) extending in the axial direction of the rotary shaft and has a supply hole for lubricant supply toward the rotary shaft on the radially inner side of the nozzle member. In this configuration, the lubricant that is supplied from the supply hole of the nozzle member toward the rotary shaft is supplied to the clearance between the rotary shaft and the pad by circumferentially circulating together with the rotary shaft.

CITATION LIST

Patent Document

Patent Document 1: U.S. Pat. No. 7,237,957

SUMMARY OF THE INVENTION

Further bearing performance improvement is desired as for the configuration that is disclosed in Patent Document 1.

The present invention has been made in view of the above circumstances, and an object of the present invention is to provide a pad bearing and a rotary machine with which bearing performance improvement can be achieved.

In order to solve the above problem, the present invention adopts the following means.

According to a first aspect of the present invention, a pad bearing includes a pad disposed on an outer side of a rotary shaft in a radial direction and supporting the rotary shaft so as to be rotatable around an axis, a block-shaped nozzle member disposed in a front in a rotation direction of the rotary shaft with respect to the pad on the radially outer side of the rotary shaft and including a discharge hole for discharging a lubricant toward an outer peripheral surface of the rotary shaft, and a compressed flow forming unit disposed in at least one of the pad and the nozzle member and configured to compress a flow of the lubricant flowing along the outer peripheral surface of the rotary shaft as the rotary shaft rotates.

In this configuration, the lubricant discharged from the discharge hole of the nozzle member toward the outer peripheral surface of the rotary shaft comes into contact with the outer peripheral surface of the rotary shaft and flows rearward in the rotation direction of the rotary shaft as the rotary shaft rotates. The lubricant flowing rearward in the rotation direction flows toward the space between the pad and the outer peripheral surface of the rotary shaft. The flow of the lubricant is compressed toward the outer peripheral surface of the rotary shaft by the compressed flow forming unit. Accordingly, the lubricant is capable of efficiently flowing into the space between the outer peripheral surface of the rotary shaft and the pad. As a result, it is possible to restrain the flow of the lubricant from leaking out to the clearance between the pad and the nozzle member upstream of the pad without flowing into the space between the outer peripheral surface of the rotary shaft and the pad. As a result, the amount of the lubricant that is supplied from the nozzle member can be reduced and bearing performance improvement can be achieved.

According to a second aspect of the present invention, the compressed flow forming unit according to the first aspect may include a recess portion forming portion forming a recess portion turning part of the flow of the lubricant in a direction opposite to the rotation direction of the rotary shaft at a position separated to the radially outer side of the rotary shaft in a front portion of the pad in the rotation direction of the rotary shaft.

In this configuration, a swirl turning in the direction that is opposite to the rotation direction of the rotary shaft is generated once the flow of the lubricant toward the space between the pad and the outer peripheral surface of the rotary shaft partially enters the recessed portion. The swirl has a flow component in a direction from the radially outer side of the rotary shaft toward the outer peripheral surface of the rotary shaft. Accordingly, when the lubricant flows in the circumferential direction from the nozzle member toward the pad, spreading of the lubricant flow toward the radially outer side between the nozzle member and the pad is suppressed. In other words, the flow of the lubricant toward the space between the pad and the outer peripheral surface of the rotary shaft is pushed to the radially inner side and compressed. As a result of this compression, the flow of the lubricant is capable of efficiently flowing into the space between the outer peripheral surface of the rotary shaft and the pad.

In addition, with the swirl generated by the recess portion, it is possible to restrain part of the flow of the lubricant toward the space between the pad and the outer peripheral surface of the rotary shaft from leaking out to the clearance between the pad and the nozzle member. Accordingly, it is possible to reduce the amount of the lubricant that is supplied from the nozzle member.

According to a third aspect of the present invention, in the pad bearing according to the second aspect, at least part of the recess portion may be disposed on a radially inner side beyond a radially inner end portion of the nozzle member in the radial direction.

With this configuration, it is possible to generate the swirl by efficiently capturing, by means of the recess portion, part of the flow of the lubricant that has passed through the clearance between the radially inner end portion of the nozzle member and the outer peripheral surface of the rotary shaft.

According to a fourth aspect of the present invention, the nozzle member according to any one of the first to third aspects includes a facing surface facing the outer peripheral surface of the rotary shaft at a distance in the radial direction. The compressed flow forming unit may include a projection formed on the facing surface and protruding to an inner side in the radial direction.

In this configuration, part of the flow of a lubricant that flows between the outer peripheral surface of the rotary shaft and the facing surface of the nozzle member hits the projection. Generated as a result is a swirl turning in the same direction as the rotation direction of the rotary shaft. The swirl flows from the facing surface side of the nozzle member toward the rotary shaft side on the radially inner side in the rear in the rotation direction. Then, the swirl turns from the rotary shaft side toward the facing surface of the nozzle member in the front in the rotation direction. The flow of the lubricant toward the space between the pad and the outer peripheral surface of the rotary shaft is pushed to the radially inner side and compressed by the swirl. As a result of this compression, the flow of the lubricant is capable of efficiently flowing into the space between the outer peripheral surface of the rotary shaft and the pad.

According to a fifth aspect of the present invention, in the pad bearing according to any one of the first to fourth aspects, the compressed flow forming unit may include a non-contact seal portion formed on at least one of a nozzle end surface facing the pad in a circumferential direction around the axis in the nozzle member and a pad end surface facing the nozzle end surface in the circumferential direction in the pad and having a seal surface spreading in a direction intersecting with the nozzle end surface and the pad end surface.

In this configuration, a lubricant that flows toward the radially outer side Dro through the clearance between the pad end surface of the pad and the nozzle end surface of the nozzle member collides with the seal surface and becomes a swirl. As a result, it is possible to reduce the amount of the lubricant that leaks out toward the outside in the radial direction from the clearance between the pad end surface of the pad and the nozzle end surface of the nozzle member upstream of the pad end surface of the pad. Accordingly, it is possible to restrain the flow of the lubricant that flows from the nozzle member toward the pad along the outer peripheral surface of the rotary shaft from spreading to the outside in the radial direction, and it is possible to compress the flow of the lubricant toward the outer peripheral surface of the rotary shaft.

According to a sixth aspect of the present invention, the nozzle member according to any one of the first to fifth aspects may include a branching guide portion provided in a front portion in the rotation direction of the rotary shaft and guiding part of the flow of the lubricant flowing along the outer peripheral surface of the rotary shaft as the rotary shaft rotates to the radially outer side along the nozzle member.

With this configuration, a lubricant (carryover oil) that is raised in temperature by circulating together along the outer peripheral surface of the rotary shaft as the rotary shaft rotates can be partially guided to the outside in the radial direction in front of the nozzle member in the rotation direction by the branching guide portion. As a result, the amount by which the temperature-raised lubricant joins a new lubricant supplied from the nozzle member can be reduced. Accordingly, it is possible to suppress a rise in the temperature of the lubricant that is sent into the space between the pad on the downstream side of the nozzle member and the outer peripheral surface of the rotary shaft.

Accordingly, it is possible to suppress a decrease in lubricant viscosity without increasing the flow rate of the new lubricant supplied from the nozzle member, and it is possible to enhance the lubricity between the pad and the rotary shaft.

According to a seventh aspect of the present invention, in the pad bearing according to the sixth aspect, the branching guide portion may have a protruding portion protruding from a radially inner end portion of the nozzle member to the front in the rotation direction of the rotary shaft.

In this configuration, the protruding portion protruding to the upstream side from the radially inner end portion of the nozzle member is capable of efficiently guiding part of a lubricant flowing from the upstream side of the nozzle member to the radially outer side.

According to an eighth aspect of the present invention, in the pad bearing according to the seventh aspect, the protruding portion may be formed so as to have a thickness dimension in the radial direction gradually decreasing from a rear toward the front in the rotation direction of the rotary shaft.

With this configuration, part of the flow of a lubricant can be efficiently guided to the radially outer side when the lubricant that flows from the upstream side of the nozzle member hits the protruding portion. Disturbance of the flow of the lubricant can be suppressed when the protruding portion has a tip that has an acute angle.

According to a ninth aspect of the present invention, in the pad bearing according to the seventh or eighth aspect, a front tip portion of the protruding portion in the rotation direction may be formed in a circular arc shape.

With this configuration, the flow of a lubricant is allowed to stably branch into a flow flowing into the space between the rotary shaft and the nozzle member and a flow guided to the radially outer side along the nozzle member even in the event of disturbance of the lubricant that flows from the upstream side of the nozzle member.

According to a tenth aspect of the present invention, in the pad bearing according to any one of the sixth to ninth aspects, the branching guide portion may have an inflow hole forming portion provided in a front of the nozzle member in the rotation direction and forming an inflow hole into which part of the flow of the lubricant flowing along the outer peripheral surface of the rotary shaft as the rotary shaft rotates flows. The inflow hole may have a nozzle portion smaller in flow path cross-sectional area than an inlet portion into which the lubricant flows.

In this configuration, part of the lubricant flowing from the upstream side of the nozzle member flows into the inflow hole. The inflow hole has the nozzle portion, which is smaller in flow path cross-sectional area than the inlet portion into which the lubricant flows, and thus the flow velocity of the lubricant in the inflow hole becomes higher in the nozzle portion, which is smaller in flow path cross-sectional area than the inlet portion, than in the inlet portion. As a result, part of the lubricant flowing from the upstream side of the nozzle member is suctioned into the inlet portion of the inflow hole. Accordingly, part of the lubricant flowing from the upstream side of the nozzle member can be efficiently guided to the radially outer side. As a result, it is possible to suppress a rise in the temperature of the lubricant that is sent into the space between the pad on the downstream side of the nozzle member and the outer peripheral surface of the rotary shaft. Accordingly, it is possible to suppress a decrease in lubricant viscosity, and it is possible to enhance the lubricity between the pad and the rotary shaft.

According to an eleventh aspect of the present invention, in the pad bearing according to any one of the first to tenth aspects, the nozzle member may include a first surface forming a first clearance between the outer peripheral surface of the rotary shaft and the first surface with the discharge hole open to the first surface and a second surface provided behind the first surface in the rotation direction of the rotary shaft and forming a second clearance smaller than the first clearance between the outer peripheral surface of the rotary shaft and the second surface.

In this configuration, a lubricant discharged from the discharge hole of the nozzle member toward the outer peripheral surface of the rotary shaft flows toward the rear in the rotation direction of the rotary shaft as the rotary shaft rotates. The second clearance between the outer peripheral surface of the rotary shaft and the second surface is smaller than the first clearance between the outer peripheral surface of the rotary shaft and the first surface, and thus the lubricant that flows toward the rear in the rotation direction is compressed by flowing into the second clearance from the first clearance. As a result, in a case where air mixes with the lubricant discharged from the discharge hole and air bubbles are generated, the air bubbles can be eliminated. Accordingly, it is possible to suppress a decline in the vibration damping effect and shaft support rigidity of the bearing attributable to air bubbles mixed during lubrication. As a result, the vibration characteristics of the bearing can be enhanced and bearing performance improvement can be achieved.

According to a twelfth aspect of the present invention, in the pad bearing according to the eleventh aspect, an inclined surface may be formed between the first surface and the second surface such that a clearance between the inclined surface and the outer peripheral surface of the rotary shaft gradually decreases from the front toward a rear in the rotation direction of the rotary shaft.

With this configuration, a lubricant discharged from the discharge hole of the nozzle member toward the outer peripheral surface of the rotary shaft is gradually compressed on the inclined surface when the lubricant flows into the second clearance from the first clearance. As a result, air bubbles in the lubricant discharged from the discharge hole can be eliminated.

According to a thirteenth aspect of the present invention, in the pad bearing according to the eleventh aspect, a step portion forming surface extending in the radial direction of the rotary shaft may be provided between the first surface and the second surface.

In this configuration, a step portion is formed between the first surface and the second surface by the step portion forming surface. A lubricant discharged from the discharge hole of the nozzle member toward the outer peripheral surface of the rotary shaft is compressed when the lubricant flows toward the rear in the rotation direction of the rotary shaft and flows into the second clearance from the first clearance. In addition, the lubricant is rapidly compressed in the step portion formed by the step portion forming surface when the lubricant flows into the second clearance from the first clearance. As a result, air bubbles in the lubricant discharged from the discharge hole can be eliminated in a more reliable manner.

According to a fourteenth aspect of the present invention, a pad bearing includes a pad disposed on an outer side of a rotary shaft in a radial direction and supporting the rotary shaft so as to be rotatable around an axis, a block-shaped nozzle member disposed in a front in a rotation direction of the rotary shaft with respect to the pad on the radially outer side of the rotary shaft and including a discharge hole for discharging a lubricant toward an outer peripheral surface of the rotary shaft, and a branching guide portion provided in a front of the nozzle member in the rotation direction and guiding part of a flow of the lubricant flowing along the outer peripheral surface of the rotary shaft as the rotary shaft rotates to the radially outer side along the nozzle member.

With this configuration, it is possible to reduce the amount by which the temperature-raised lubricant joins a lubricant newly supplied from the nozzle member. As a result, it is possible to suppress a rise in the temperature of the lubricant that is sent into the space between the pad on the downstream side and the outer peripheral surface of the rotary shaft without increasing the flow rate of the new lubricant supplied from the nozzle member. Accordingly, it is possible to suppress a decrease in lubricant viscosity, and it is possible to enhance the lubricity between the pad and the rotary shaft.

According to a fifteenth aspect of the present invention, a pad bearing includes a pad disposed on an outer side of a rotary shaft in a radial direction and supporting the rotary shaft so as to be rotatable around an axis and a block-shaped nozzle member disposed in a front in a rotation direction of the rotary shaft with respect to the pad on the radially outer side of the rotary shaft and including a discharge hole for discharging a lubricant toward an outer peripheral surface of the rotary shaft. The nozzle member includes a first surface forming a first clearance between the outer peripheral surface of the rotary shaft and the first surface with the discharge hole open to the first surface and a second surface provided behind the first surface in the rotation direction of the rotary shaft and forming a second clearance smaller than the first clearance between the outer peripheral surface of the rotary shaft and the second surface.

In this configuration, the lubricant discharged from the discharge hole of the nozzle member toward the outer peripheral surface of the rotary shaft flows rearward in the rotation direction of the rotary shaft as the rotary shaft rotates. The second clearance between the outer peripheral surface of the rotary shaft and the second surface is smaller than the first clearance between the outer peripheral surface of the rotary shaft and the first surface, and thus the lubricant that flows toward the rear in the rotation direction is compressed by flowing into the second clearance from the first clearance. As a result, in a case where air mixes with the lubricant discharged from the discharge hole and air bubbles are generated, the air bubbles can be eliminated. Accordingly, it is possible to suppress a decline in the vibration damping effect and shaft support rigidity of the bearing attributable to air bubbles mixed during lubrication. As a result, the vibration characteristics of the bearing can be enhanced and bearing performance improvement can be achieved.

According to a sixteenth aspect of the present invention, in the pad bearing according to the fifteenth aspect, an inclined surface may be formed between the first surface and the second surface such that a clearance between the inclined surface and the outer peripheral surface of the rotary shaft gradually decreases from the front toward a rear in the rotation direction of the rotary shaft.

With this configuration, a lubricant discharged from the discharge hole of the nozzle member toward the outer peripheral surface of the rotary shaft is gradually compressed on the inclined surface when the lubricant flows into the second clearance from the first clearance. As a result, air bubbles in the lubricant discharged from the discharge hole can be eliminated.

According to a seventeenth aspect of the present invention, in the pad bearing according to the fifteenth aspect, a step portion forming surface extending in the radial direction of the rotary shaft may be provided between the first surface and the second surface.

In this configuration, a step portion is formed between the first surface and the second surface by the step portion forming surface. A lubricant discharged from the discharge hole of the nozzle member toward the outer peripheral surface of the rotary shaft is compressed when the lubricant flows toward the rear in the rotation direction of the rotary shaft and flows into the second clearance from the first clearance. In addition, the lubricant is rapidly compressed in the step portion formed by the step portion forming surface when the lubricant flows into the second clearance from the first clearance. As a result, air bubbles in the lubricant discharged from the discharge hole can be eliminated in a more reliable manner.

According to an eighteenth aspect of the present invention, a rotary machine includes the pad bearing according to any one of the first to seventeenth aspects and a rotary shaft supported by the pad of the pad bearing so as to be rotatable around the axis.

With this configuration, bearing performance improvement can be achieved and the efficiency of the rotary machine can be improved.

Bearing performance improvement can be achieved with the pad bearing and the rotary machine described above.

DETAILED DESCRIPTION OF THE INVENTION

Hereinafter, a pad bearing and a rotary machine according to an embodiment of the present invention will be described with reference to accompanying drawings.

First Embodiment

Figure 1:
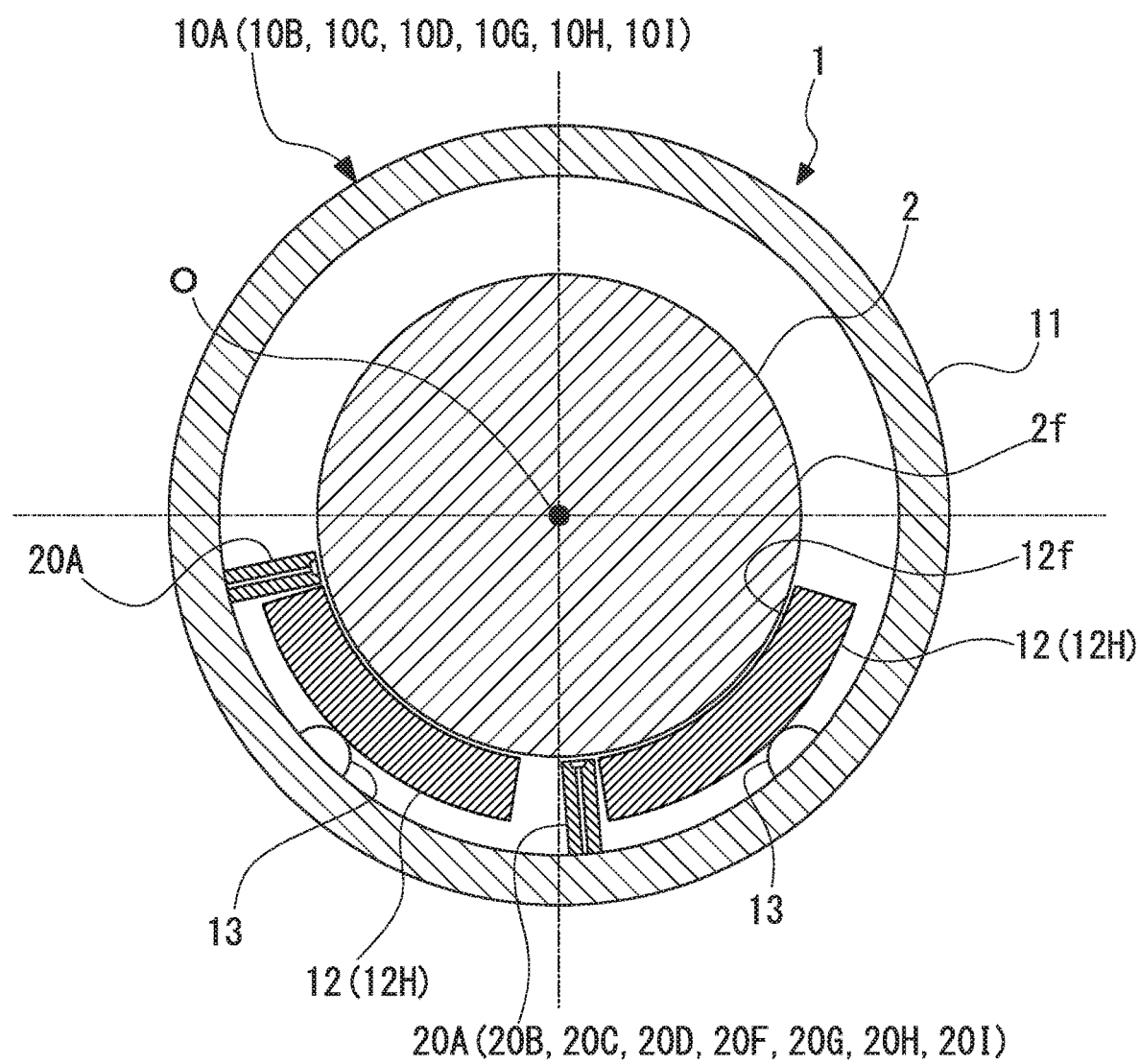
FIG. 1 is a schematic diagram illustrating an overall configuration of a pad bearing and a rotary machine according to an embodiment of the present invention.
Figure 2:
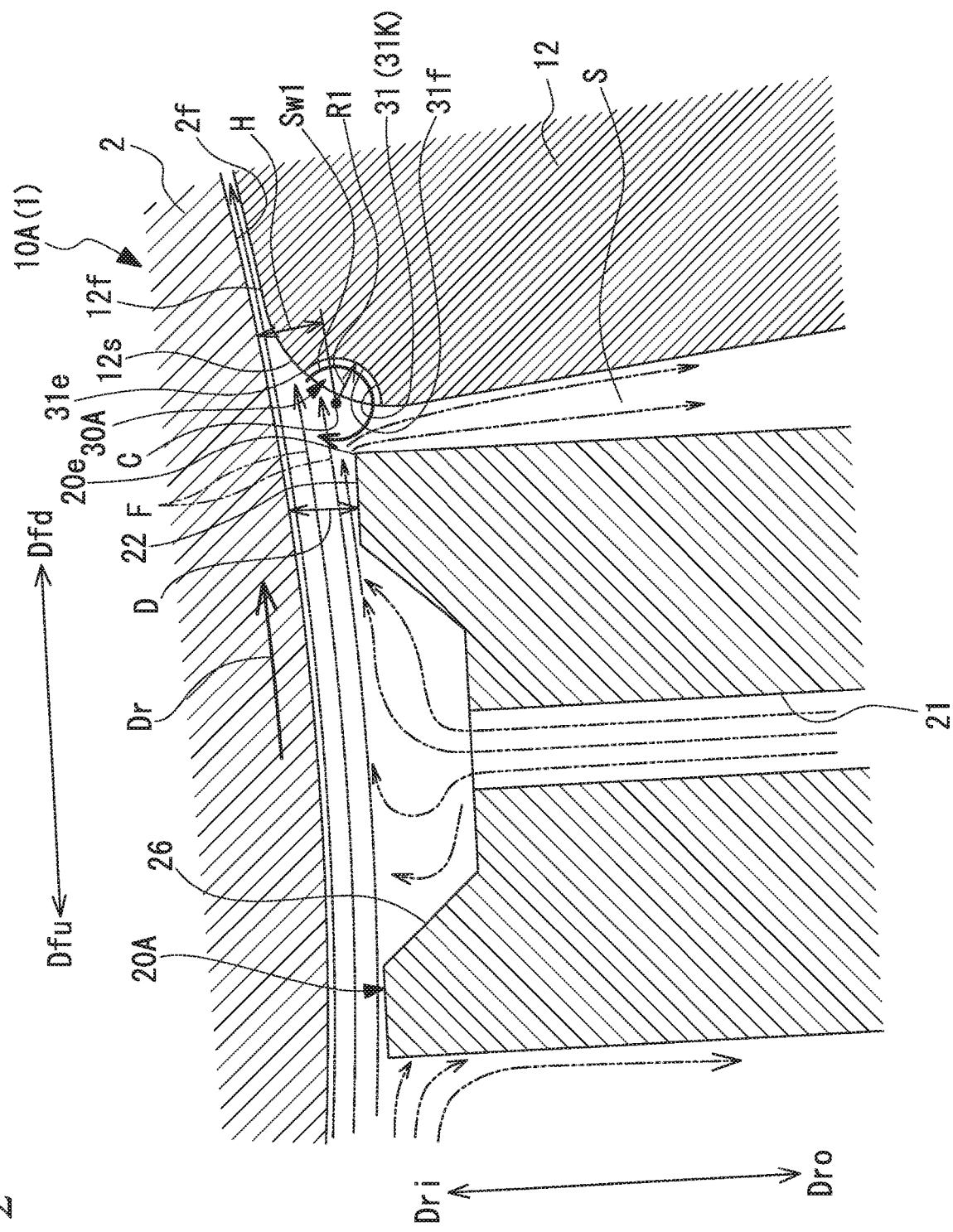
FIG. 2 is a cross-sectional view illustrating the configuration of the pad bearing according to a first embodiment of the pad bearing and the rotary machine.

FIG. 1 is a schematic diagram illustrating an overall configuration of the pad bearing and the rotary machine according to this embodiment. FIG. 2 is a cross-sectional view illustrating the configuration of the pad bearing.

As illustrated in FIG. 1, a rotary machine 1 of this embodiment is provided with a rotary shaft 2 and a pad bearing 10A that supports the rotary shaft 2 so as to be rotatable around an axis O.

The pad bearing 10A is provided with an annular bearing housing 11, a pad 12, a nozzle member 20A, and a compressed flow forming unit 30A (see FIG. 2).

The pad 12 is disposed on the radially outer side of the rotary shaft 2 on the radially inner side of the bearing housing 11. A plurality of the pads 12 are provided in the circumferential direction around the axis O. In this embodiment, two pads 12 are disposed on the lower side in a load direction, that is, an upward-downward direction with respect to the rotary shaft 2. A support member 13 is provided on the inner peripheral surface of the bearing housing 11. Each pad 12 is swingably supported by the support member 13. The pads 12 support the rotary shaft 2 so as to be rotatable around the axis O.

Each pad 12 has a circular arc shape when viewed from the axis O direction of the rotary shaft 2. Each pad 12 has a curved plate shape extending in the same cross-sectional shape in the axis O direction. The curvature radius of a sliding surface 12f of the pad 12 is formed so as to be slightly larger than the curvature radius of an outer peripheral surface 2f of the rotary shaft 2. In other words, the entire surface of the sliding surface 12f of the pad 12 is not in contact with the rotary shaft 2. The sliding surface 12f of the pad 12 can be formed of a soft metal such as a white bearing (babbitt bearing).

As illustrated in FIG. 2, an inclined portion 12s is formed in the front end portion of the sliding surface 12f of the pad 12 in a rotation direction Dr of the rotary shaft 2. The inclined portion 12s is curved so as to be gradually separated from the outer peripheral surface 2f of the rotary shaft 2 to the radially outer side from the sliding surface 12f behind the inclined portion 12s in the rotation direction Dr toward the front in the rotation direction Dr. Here, as the rotary shaft 2 rotates, a lubricant in contact with the outer peripheral surface 2f of the rotary shaft 2 circulates together and flows in the circumferential direction about the axis O. In the following description, the upstream side in the direction in which the lubricant flows in the circumferential direction about the rotary shaft 2 will be referred to as an upstream side Dfu and the downstream side in the direction will be referred to as a downstream side Dfd. The upstream side Dfu corresponds to the front in the rotation direction Dr and the downstream side Dfd corresponds to the rear in the rotation direction Dr. In addition, the radially inner side about the axis O will be referred to as a radially inner side Dri and the radially outer side about the axis O will be referred to as a radially outer side Dro.

The nozzle member 20A is disposed on the upstream side Dfu with respect to the pad 12 on the radially outer side Dro of the rotary shaft 2. The nozzle member 20A is fixed to the bearing housing 11. The nozzle member 20A extends in the axis O direction and has a width equal to the width of the pad 12 in the axis O direction. The nozzle member 20A has a predetermined length in the circumferential direction around the axis O. In addition, the nozzle member 20A protrudes from the inner peripheral surface of the bearing housing 11 toward the radially inner side Dri. As a result, the nozzle member 20A has a substantially rectangular parallelepiped block shape extending in the axis O direction.

The nozzle member 20A has a discharge hole 21 for discharging the lubricant toward the outer peripheral surface 2f of the rotary shaft 2. A plurality of the discharge holes 21 are spaced apart in the axis O direction. In addition, the nozzle member 20A has a nozzle tip surface (facing surface) 22 facing the outer peripheral surface 2f of the rotary shaft 2 at a distance in the radial direction. The nozzle tip surface 22 is provided with a nozzle recess portion 26 recessed toward the radially outer side Dro. The discharge hole 21 is open to the bottom surface of the nozzle recess portion 26.

A lubricant is supplied to the nozzle member 20A from a lubricant supply source (not illustrated). The lubricant is discharged toward the outer peripheral surface 2f of the rotary shaft 2 through the discharge hole 21. The discharged lubricant flows along the outer peripheral surface 2f of the rotary shaft 2 as the rotary shaft 2 rotates. At this time, the already supplied lubricant circulates together and flows along the outer peripheral surface 2f of the rotary shaft 2 as the rotary shaft 2 rotates. The lubricant discharged from the discharge hole 21 joins a flow F of the lubricant circulating together with the rotary shaft 2.

The compressed flow forming unit 30A compresses the flow F of the lubricant that flows along the outer peripheral surface 2f of the rotary shaft 2 as the rotary shaft 2 rotates. In this embodiment, the pad 12 is provided with the compressed flow forming unit 30A. The compressed flow forming unit 30A has a recess portion forming portion 31K forming a recess portion 31, which is formed in the inclined portion 12s in the front portion of the pad 12 on the upstream side Dfu. The recess portion 31 is recessed toward the radially outer side Dro on the upstream side Dfu and at a position separated from the outer peripheral surface 2f of the rotary shaft 2 with respect to the inclined portion 12s. The recess portion 31 is continuously formed in the same cross-sectional shape in the axis O direction. The recess portion 31 has a circular arc-shaped inner peripheral surface 31f, which has a curvature radius R1 about a point C positioned on the upstream side Dfu with respect to the recess portion 31.

In the radial direction about the axis O, at least part of the recess portion 31 is disposed on the radially inner side Dri beyond an end portion 20e of the nozzle member 20A on the radially inner side Dri.

The recess portion 31 generates a swirl Sw1 by turning part of the flow F of the lubricant toward the space between the pad 12 and the outer peripheral surface 2f of the rotary shaft 2 in the direction that is opposite to the rotation direction Dr of the rotary shaft 2. Specifically, the lubricant discharged from the discharge hole 21 as described above comes into contact with the outer peripheral surface 2f of the rotary shaft 2 and flows toward the downstream side Dfd (rearward in the rotation direction Dr) as the rotary shaft 2 rotates. Once the flow F of the lubricant passes through the space between the nozzle tip surface 22 of the nozzle member 20A and the outer peripheral surface 2f of the rotary shaft 2, the flow F of the lubricant heads toward the space between the pad 12 on the downstream side Dfd and the outer peripheral surface 2f of the rotary shaft 2. Part of the lubricant flow F on the radially inner side Dri flows into the recess portion 31. The lubricant that has flowed into the recess portion 31 flows along the inner peripheral surface 31f of the recess portion 31 in a direction away from the outer peripheral surface 2f of the rotary shaft 2 to the radially outer side Dro. Then, the lubricant turns back to the radially inner side Dri and in the direction that is opposite to the rotation direction Dr and flows out from the recess portion 31. As a result, the swirl Sw1 turning in the direction that is opposite to the rotation direction Dr of the rotary shaft 2 is generated.

The swirl Sw1 generated in the recess portion 31 has a flow component in a direction from the radially outer side Dro of the rotary shaft 2 toward the outer peripheral surface 2f of the rotary shaft 2. Accordingly, when the lubricant flows in the circumferential direction from the nozzle member 20A toward the pad 12, spreading of the lubricant flow toward the radially outer side Dro between the nozzle member 20A and the pad 12 is suppressed. In other words, the flow of the lubricant toward the space between the pad 12 and the outer peripheral surface 2f of the rotary shaft 2 is pushed to the radially inner side Dri and compressed.

In addition, the swirl Sw1 generated in the recess portion 31 restrains part of the flow F of the lubricant toward the space between the pad 12 and the outer peripheral surface 2f of the rotary shaft 2 from leaking out to a clearance S between the pad 12 and the nozzle member 20A.

Here, it is difficult to obtain the effect resulting from the generation of the swirl Sw1 in the recess portion 31 when an end portion 31e of the recess portion 31 on the radially inner side Dri is too far from the outer peripheral surface 2f of the rotary shaft 2 to the radially outer side Dro. When the end portion 31e of the recess portion 31 on the radially inner side Dri is too close to the outer peripheral surface 2f of the rotary shaft 2, the amount of the lubricant that flows into the space between the pad 12 and the outer peripheral surface 2f of the rotary shaft 2 without entering the recess portion 31 decreases and the amount of the lubricant that leaks out to the clearance between the pad 12 and the nozzle member 20A relatively increases.

In this regard, it is preferable that the point C as the center of the inner peripheral surface 31f of the recess portion 31 is set such that a distance H in the radial direction from the outer peripheral surface 2f of the rotary shaft 2 is approximately $$1/2 \cdot D \leq H \leq 1 \cdot D$$

with respect to a gap D between the outer peripheral surface 2f of the rotary shaft 2 and the nozzle tip surface 22 of the nozzle member 20A. As a result, it is possible to generate the swirl Sw1 by efficiently capturing part of the flow F of the lubricant toward the space between the pad 12 and the outer peripheral surface 2f of the rotary shaft 2 by means of the recess portion 31.

In addition, it is preferable that a curvature radius R of the inner peripheral surface 31f of the recess portion 31 is as follows.

$$R < 1/2 \cdot H$$

As a result, a contraction effect (a compressed effect) can be efficiently given by the swirl Sw1 generated in the recess portion 31 to the flow F of the lubricant circulating together and heading toward the space between the pad 12 and the outer peripheral surface 2f of the rotary shaft 2 as the rotary shaft 2 rotates.

Therefore, according to the first embodiment described above, the flow F of the lubricant that flows along the outer peripheral surface 2f of the rotary shaft 2 as the rotary shaft 2 rotates is compressed by the compressed flow forming unit 30A. As a result, the flow of the lubricant is capable of efficiently flowing into the space between the outer peripheral surface 2f of the rotary shaft 2 and the pad 12. As a result, the amount of the lubricant that is supplied to the space between the outer peripheral surface 2f of the rotary shaft 2 and the pad 12 can be relatively increased and lubricity enhancement can be achieved.

In this manner, with the pad bearing 10A and the rotary machine 1, it is possible to achieve bearing performance improvement by reducing the amount of the lubricant that is supplied from the nozzle member 20A and it is possible to improve the efficiency of the rotary machine 1.

In addition, in the compressed flow forming unit 30A, the recess portion 31 generates the swirl Sw1 by turning part of the flow F of the lubricant in the direction that is opposite to the rotation direction Dr of the rotary shaft 2 at a position spaced apart to the radially outer side Dro of the rotary shaft 2. The flow F of the lubricant toward the space between the pad 12 and the outer peripheral surface 2f of the rotary shaft 2 is pushed to the radially inner side Dri and compressed by the swirl Sw1. As a result of this compression, the flow of the lubricant is capable of efficiently flowing into the space between the outer peripheral surface 2f of the rotary shaft 2 and the pad 12.

In addition, with the swirl Sw1 generated by the recess portion 31, it is possible to restrain part of the flow F of the lubricant toward the space between the pad 12 and the outer peripheral surface 2f of the rotary shaft 2 from leaking out to the clearance S between the pad 12 and the nozzle member 20A. Accordingly, it is possible to reduce the amount of the lubricant that is supplied from the nozzle member 20A.

In addition, in the radial direction, at least part of the recess portion 31 is disposed on the radially inner side Dri beyond the end portion 20e of the nozzle member 20A on the radially inner side Dri. As a result, it is possible to generate the swirl Sw1 by efficiently capturing, by means of the recess portion 31, part of the flow F of the lubricant that has passed through the clearance between the end portion 20e of the nozzle member 20A on the radially inner side Dri and the outer peripheral surface 2f of the rotary shaft 2.

Second Embodiment

Next, the pad bearing and the rotary machine according to a second embodiment of the present invention will be described. The only difference of the following second embodiment from the first embodiment is the configuration of a compressed flow forming unit 30B. Accordingly, parts identical to those of the first embodiment are denoted by the same reference numerals so that the same description does not have to be repeated.

Figure 3:
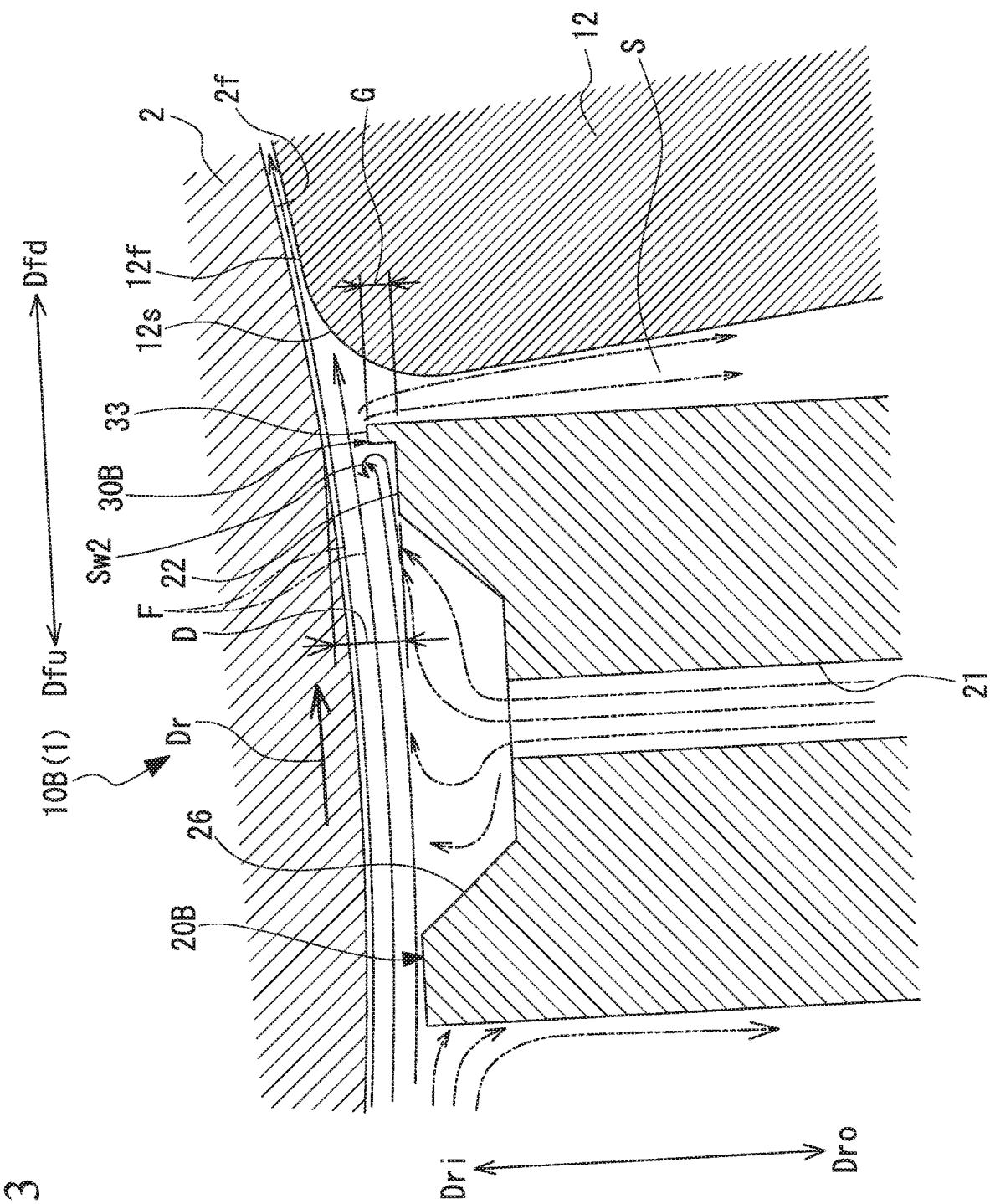
FIG. 3 is a cross-sectional view illustrating the configuration of the pad bearing according to a second embodiment of the pad bearing and the rotary machine.

FIG. 3 is a cross-sectional view illustrating the configuration of the pad bearing according to the second embodiment of the pad bearing and the rotary machine.

As illustrated in FIG. 3, the rotary machine 1 according to this embodiment is provided with the rotary shaft 2 and a pad bearing 10B that supports the rotary shaft 2 so as to be rotatable around the axis O.

The pad bearing 10B is provided with the annular bearing housing 11 (see FIG. 1), the pad 12, a nozzle member 20B, and the compressed flow forming unit 30B.

The nozzle member 20B is provided with the compressed flow forming unit 30B on the nozzle tip surface 22. The compressed flow forming unit 30B has a projection 33 formed on the nozzle tip surface 22 and protruding to the radially inner side Dri. The projection 33 extends in the axis O direction.

Part of the flow F of a lubricant that flows between the outer peripheral surface 2f of the rotary shaft 2 and the nozzle tip surface 22 of the nozzle member 20B hits the projection 33. As a result, a swirl Sw2 turning in the same direction as the rotation direction Dr of the rotary shaft 2 is generated. The swirl Sw2 flows from the nozzle tip surface 22 side of the nozzle member 20B toward the rotary shaft 2 side on the radially inner side Dri in the rear in the rotation direction Dr. Then, the swirl Sw2 turns from the rotary shaft 2 side toward the nozzle tip surface 22 of the nozzle member 29B in the front in the rotation direction. The flow F of the lubricant toward the space between the pad 12 and the outer peripheral surface 2f of the rotary shaft 2 is pushed to the radially inner side Dri and compressed by the swirl Sw2. As a result of this compression, the flow F of the lubricant is capable of efficiently flowing into the space between the outer peripheral surface 2f of the rotary shaft 2 and the pad 12.

Here, it is preferable that a protrusion height G of the projection 33 from the nozzle tip surface 22 of the nozzle member 20B is $$1/2 \cdot D \leq G < D$$

with respect to the radial gap D between the nozzle tip surface 22 of the nozzle member 20B and the outer peripheral surface 2f of the rotary shaft 2. As a result, a contraction effect (a compressed effect) can be efficiently given by the swirl Sw2 formed by the projection 33 to the flow F of the lubricant circulating together and heading toward the space between the pad 12 and the outer peripheral surface 2f of the rotary shaft 2 as the rotary shaft 2 rotates.

Therefore, according to the second embodiment described above, the flow F of the lubricant that flows along the outer peripheral surface 2f of the rotary shaft 2 as the rotary shaft 2 rotates is compressed by the compressed flow forming unit 30B. As a result of this compression, the flow F of the lubricant is capable of efficiently flowing into the space between the outer peripheral surface 2f of the rotary shaft 2 and the pad 12. As a result, it is possible to restrain the flow F of the lubricant from leaking out to the clearance between the pad 12 and the nozzle member 20B upstream of the pad 12 without flowing into the space between the outer peripheral surface 2f of the rotary shaft 2 and the pad 12. As a result, the amount of the lubricant that is supplied to the space between the outer peripheral surface 2f of the rotary shaft 2 and the pad 12 can be relatively increased and lubricity enhancement can be achieved.

In this manner, with the pad bearing 10B and the rotary machine 1, it is possible to enhance the lubricity between the rotary shaft 2 and the pad 12.

In addition, the compressed flow forming unit 30B has the projection 33 formed on the nozzle tip surface 22 and protruding to the radially inner side Dri. The swirl Sw2 turning in the same direction as the rotation direction Dr of the rotary shaft 2 is generated by part of the flow F of the lubricant that flows between the outer peripheral surface 2f of the rotary shaft 2 and the nozzle tip surface 22 of the nozzle member 20A hitting the projection 33. The flow F of the lubricant toward the space between the pad 12 and the outer peripheral surface 2f of the rotary shaft 2 is compressed by the swirl Sw2, and the flow F of the lubricant is capable of efficiently flowing into the space between the outer peripheral surface 2f of the rotary shaft 2 and the pad 12.

Modification Example of Second Embodiment

In the second embodiment, the projection 33 protrudes to the radially inner side Dri from the nozzle tip surface 22. The present invention is not limited thereto.

Figure 4:
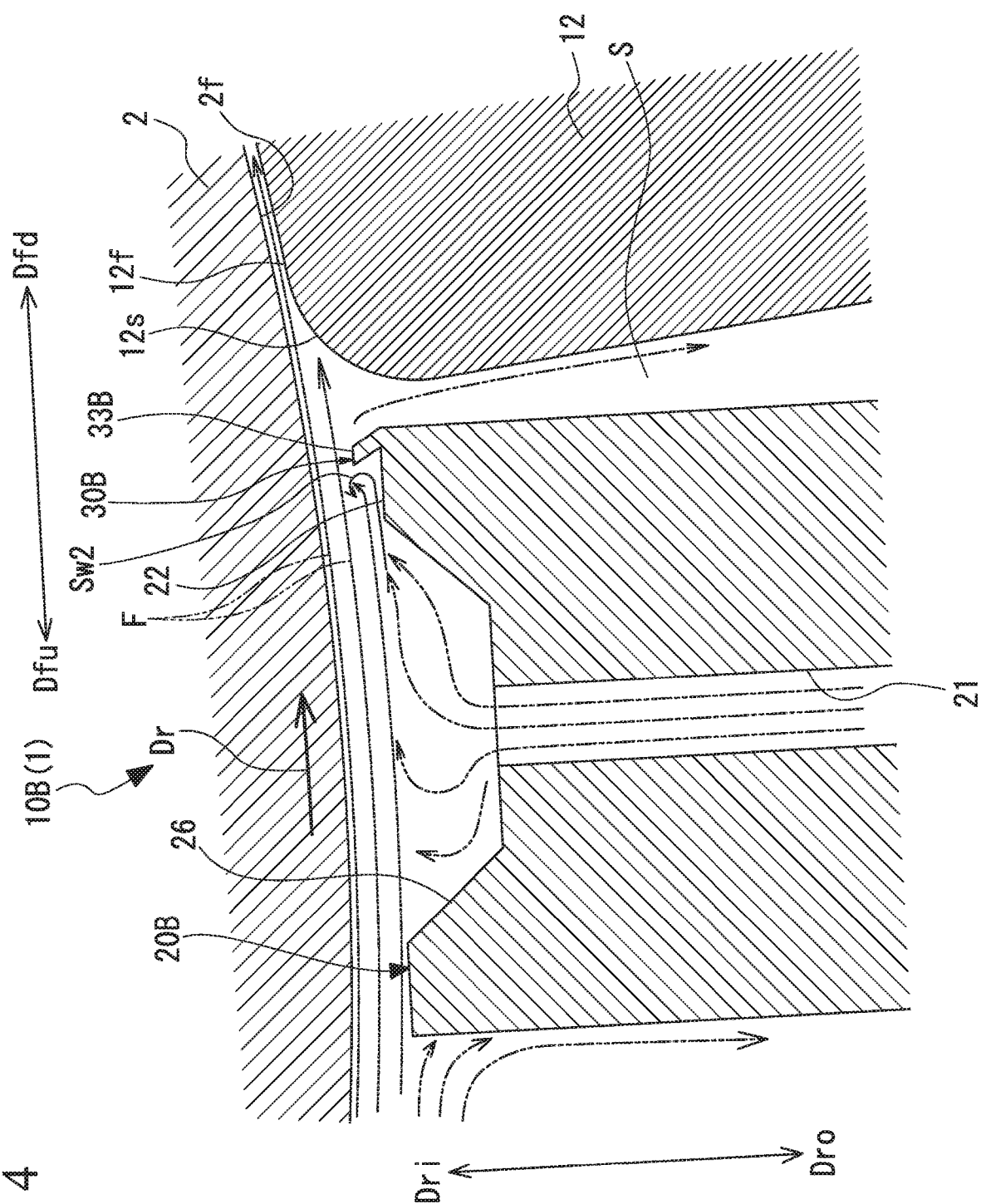
FIG. 4 is a cross-sectional view illustrating the configuration of the pad bearing according to a modification example of the second embodiment of the pad bearing and the rotary machine.

FIG. 4 is a cross-sectional view illustrating the configuration of the pad bearing according to a modification example of the second embodiment of the pad bearing and the rotary machine.

As illustrated in FIG. 4, a projection 33B as the compressed flow forming unit 30B may be provided so as to be inclined to the upstream side Dfu (or the downstream side Dfd) while protruding from the nozzle tip surface 22 to the radially inner side Dri.

Third Embodiment

Next, the pad bearing and the rotary machine according to a third embodiment of the present invention will be described. The only difference of the following third embodiment from the first and second embodiments is the configuration of a compressed flow forming unit 30C. Accordingly, parts identical to those of the first embodiment are denoted by the same reference numerals so that the same description does not have to be repeated.

Figure 5:
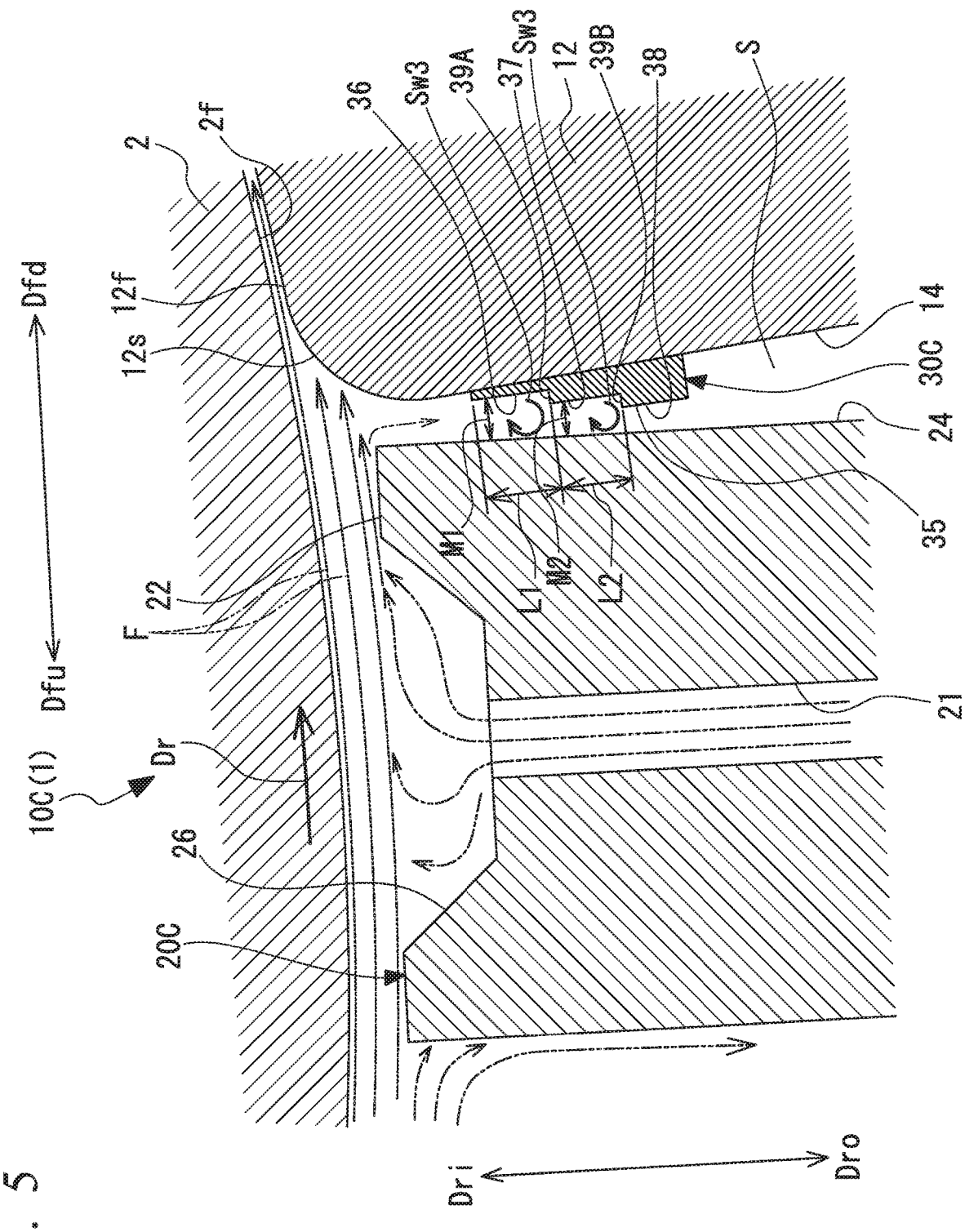
FIG. 5 is a cross-sectional view illustrating the configuration of the pad bearing according to a third embodiment of the pad bearing and the rotary machine.

FIG. 5 is a cross-sectional view illustrating the configuration of the pad bearing according to the third embodiment of the pad bearing and the rotary machine.

As illustrated in FIG. 5, the rotary machine 1 according to this embodiment is provided with the rotary shaft 2 and a pad bearing 10C that supports the rotary shaft 2 so as to be rotatable around the axis O.

The pad bearing 10C is provided with the annular bearing housing 11 (see FIG. 1), the pad 12, a nozzle member 20C, and the compressed flow forming unit 30C.

The nozzle member 20C has a nozzle end surface 24 facing the pad 12 in the circumferential direction around the axis O. The pad 12 has a pad end surface 14 facing the nozzle end surface 24 in the circumferential direction. At least one of the nozzle end surface 24 and the pad end surface 14 is provided with the compressed flow forming unit 30C. In this embodiment, the compressed flow forming unit 30C is provided with a non-contact seal portion 35 provided on the pad end surface 14 of the pad 12.

The non-contact seal portion 35 has surfaces 36, 37, and 38 facing the nozzle end surface 24 at distance in the circumferential direction. The surfaces 36 to 38 are formed with a gap from the nozzle end surface 24 decreasing in stages toward the outside from the radially inner side Dri about the axis O. As a result, seal surfaces 39A and 39B are formed between the surface 36 and the surface 37 and between the surface 37 and the surface 38. Each of the seal surfaces 39A and 39B spreads in a direction intersecting with the nozzle end surface 24 and the pad end surface 14.

In this configuration, a lubricant that flows toward the radially outer side Dro through the clearance S between the pad end surface 14 of the pad 12 and the nozzle end surface 24 of the nozzle member 20C upstream of the pad end surface 14 of the pad 12 without flowing into the space between the outer peripheral surface 2f of the rotary shaft 2 and the pad 12 collides with the seal surfaces 39A and 39B and becomes a swirl Sw3. With the swirl Sw3, it is possible to reduce the amount of the lubricant that leaks out toward the radially outer side Dro from the clearance S between the pad end surface 14 and the nozzle end surface 24. Accordingly, it is possible to restrain the flow of the lubricant that flows from the nozzle member 20C toward the pad 12 along the outer peripheral surface 2f of the rotary shaft 2 from spreading to the radially outer side Dro, and it is possible to compress the flow F of the lubricant toward the outer peripheral surface 2f of the rotary shaft 2.

Here, it is preferable that the seal surfaces 39A and 39B are formed so as to be perpendicular to the surfaces 36 and 37 so that the swirl Sw3 is efficiently generated and a leakage flow to the radially outer side Dro is suppressed at the same time.

In addition, it is preferable that radial lengths L1 and L2 of the surfaces 36 and 37 and gaps M1 and M2 between the surfaces 36 and 37 and the nozzle end surface 24 are formed such that

L1:M1=1:1

L2:M2=1:1 are satisfied for the purpose of suppressing disturbance of the swirl Sw2 that is generated by a leakage flow hitting the seal surfaces 39A and 39B.

Therefore, according to the third embodiment described above, the lubricant that leaks out to the clearance S between the pad end surface 14 of the pad 12 and the nozzle end surface 24 of the nozzle member 20C collides with the seal surfaces 39A and 39B of the non-contact seal portion 35 and generates the swirl Sw3. With the swirl Sw3, it is possible to reduce the amount of the lubricant that leaks out to the clearance S between the pad end surface 14 and the nozzle end surface 24. Accordingly, it is possible to restrain the flow of the lubricant that flows from the nozzle member 20C toward the pad 12 along the outer peripheral surface 2f of the rotary shaft 2 from spreading to the radially outer side Dro, and it is possible to compress the flow F of the lubricant toward the outer peripheral surface 2f of the rotary shaft 2. As a result, the flow F of the lubricant is capable of efficiently flowing into the space between the outer peripheral surface 2f of the rotary shaft 2 and the pad 12. As a result, it is possible to enhance the lubricity between the rotary shaft 2 and the pad 12.

In this manner, with the pad bearing 10C and the rotary machine 1, it is possible to achieve bearing performance improvement by reducing the amount of the lubricant that is supplied from the nozzle member 20A.

Fourth Embodiment

Next, the pad bearing and the rotary machine according to a fourth embodiment of the present invention will be described. The only difference of the following fourth embodiment from the first embodiment is the configuration of a branching guide portion 40D. Accordingly, parts identical to those of the first embodiment are denoted by the same reference numerals so that the same description does not have to be repeated.

Figure 6:
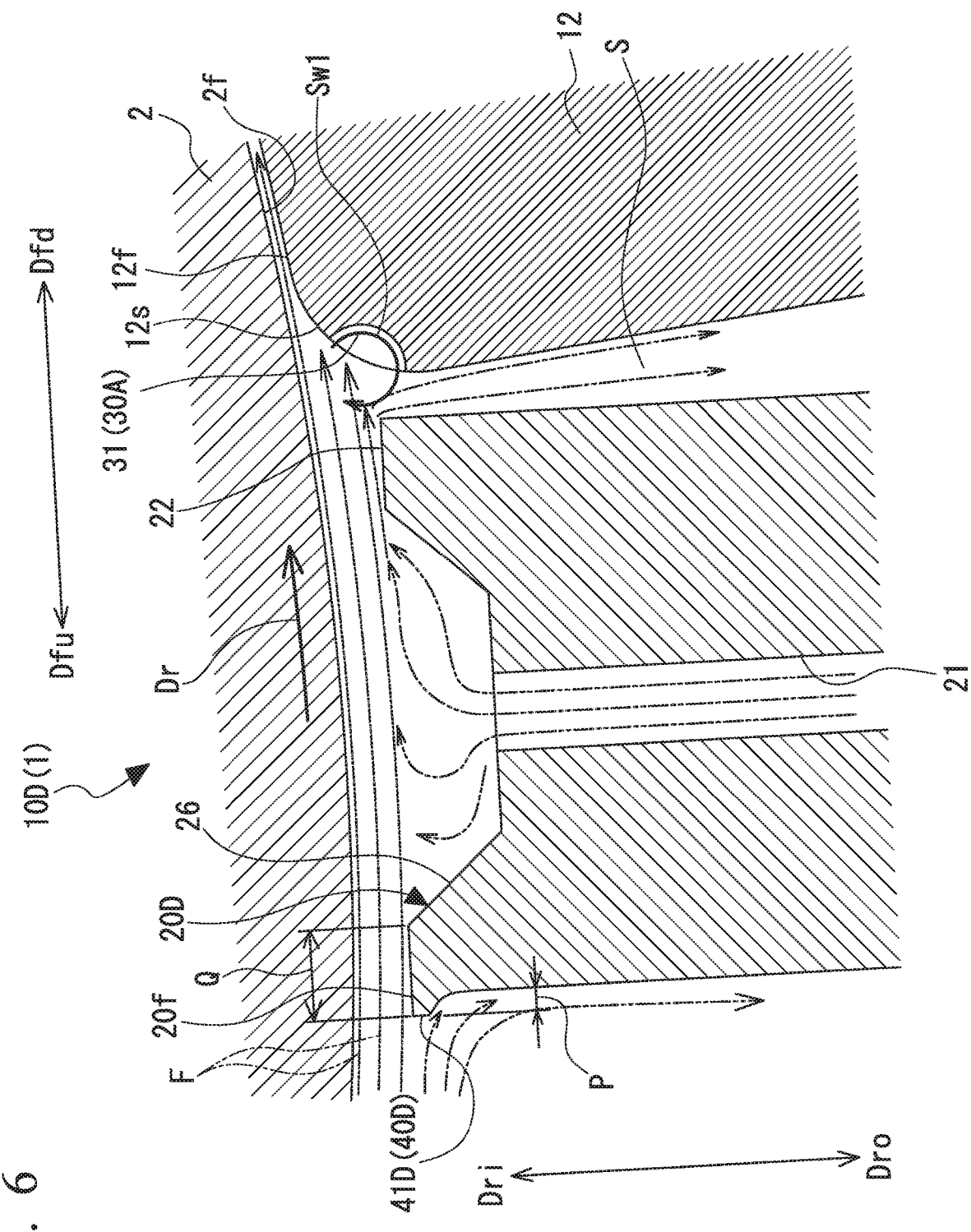
FIG. 6 is a cross-sectional view illustrating the configuration of the pad bearing according to a fourth embodiment of the pad bearing and the rotary machine.

FIG. 6 is a cross-sectional view illustrating the configuration of a pad bearing 10D according to the fourth embodiment of the pad bearing and the rotary machine.

As illustrated in FIG. 6, the rotary machine 1 according to this embodiment is provided with the rotary shaft 2 and the pad bearing 10D that supports the rotary shaft 2 so as to be rotatable around the axis O.

The pad bearing 10D is provided with the annular bearing housing 11 (see FIG. 1), the pad 12, and a nozzle member 20D. Further, the pad bearing 10D is provided with any one of the compressed flow forming units 30A to 30C illustrated in the first to third embodiments described above. In the example that is illustrated in FIG. 6, the pad bearing 10D is provided with the compressed flow forming unit 30A illustrated in the first embodiment. Alternatively, the pad bearing 10D can be a configuration that is not provided with the compressed flow forming units 30A to 30C.

The nozzle member 20D according to this embodiment is provided with the branching guide portion 40D. The branching guide portion 40D is provided on the upstream side Dfu in the nozzle member 20D. The branching guide portion 40D has a protruding portion 41D protruding to the upstream side Dfu from an end portion 20f of the nozzle member 20D, which is on the radially inner side Dri.

The branching guide portion 40D guides part of the flow F of a lubricant that flows along the outer peripheral surface 2f of the rotary shaft 2 as the rotary shaft 2 rotates to the radially outer side Dro along the nozzle member 20D. The lubricant that circulates together along the outer peripheral surface 2f of the rotary shaft 2 as the rotary shaft 2 rotates rises in temperature due to, for example, the friction between the rotary shaft 2 and the pad 12. With the temperature raised as described above, part of the flow of the lubricant (carryover oil) that circulates together along the outer peripheral surface 2f of the rotary shaft 2 as the rotary shaft 2 rotates is guided to the radially outer side Dro on the upstream side Dfu beyond the nozzle member 20D by the branching guide portion 40D. Then, the amount of the carryover oil that reaches the part of the nozzle member 20D supplying a new lubricant is reduced.

Here, it is preferable that a protrusion dimension P of the protruding portion 41D that pertains to the protrusion to the upstream side Dfu satisfies $$0.2 \cdot H \leq P \leq 0.5 \cdot H$$

with respect to a width Q of the nozzle tip surface 22. Part of the flow F of the lubricant is capable of efficiently branching to the radially outer side Dro by the protrusion dimension P of the protruding portion 41D being as large as a certain length or more. No sufficient strength can be easily ensured for the protruding portion 41D when the protrusion dimension P of the protruding portion 41D is excessively large.

Therefore, according to the fourth embodiment described above, part of the flow of the lubricant (carryover oil) that flows along the outer peripheral surface 2f of the rotary shaft 2 as the rotary shaft 2 rotates can be guided to the radially outer side Dro by the branching guide portion 40D. As a result, the amount by which the temperature-raised lubricant joins the new lubricant supplied from the nozzle member 20D is reduced. As a result, it is possible to suppress a rise in the temperature of the lubricant that is sent into the space between the pad 12 and the outer peripheral surface 2f of the rotary shaft 2, which is on the downstream side Dfd from the nozzle member 20D. Accordingly, it is possible to suppress a decrease in lubricant viscosity without increasing the flow rate of the new lubricant supplied from the nozzle member 20D, and it is possible to enhance the lubricity between the pad 12 and the rotary shaft 2.

In addition, with the protruding portion 41D protruding to the upstream side Dfu from the end portion 20f of the nozzle member 20D on the radially inner side Dri, the branching guide portion 40D is capable of efficiently guiding part of the lubricant that flows from the upstream side of the nozzle member 20D to the radially outer side Dro.

When the compressed flow forming unit 30A is provided as in the first to third embodiments described above, it is possible to compress the flow F of the lubricant that flows along the outer peripheral surface 2f of the rotary shaft 2 as the rotary shaft 2 rotates. As a result, it is possible to enhance the lubricity between the pad 12 and the rotary shaft 2.

First Modification Example of Fourth Embodiment

Although the protruding portion 41D is provided in the fourth embodiment, the shape of the protruding portion 41D can be appropriately changed.

Figure 7:
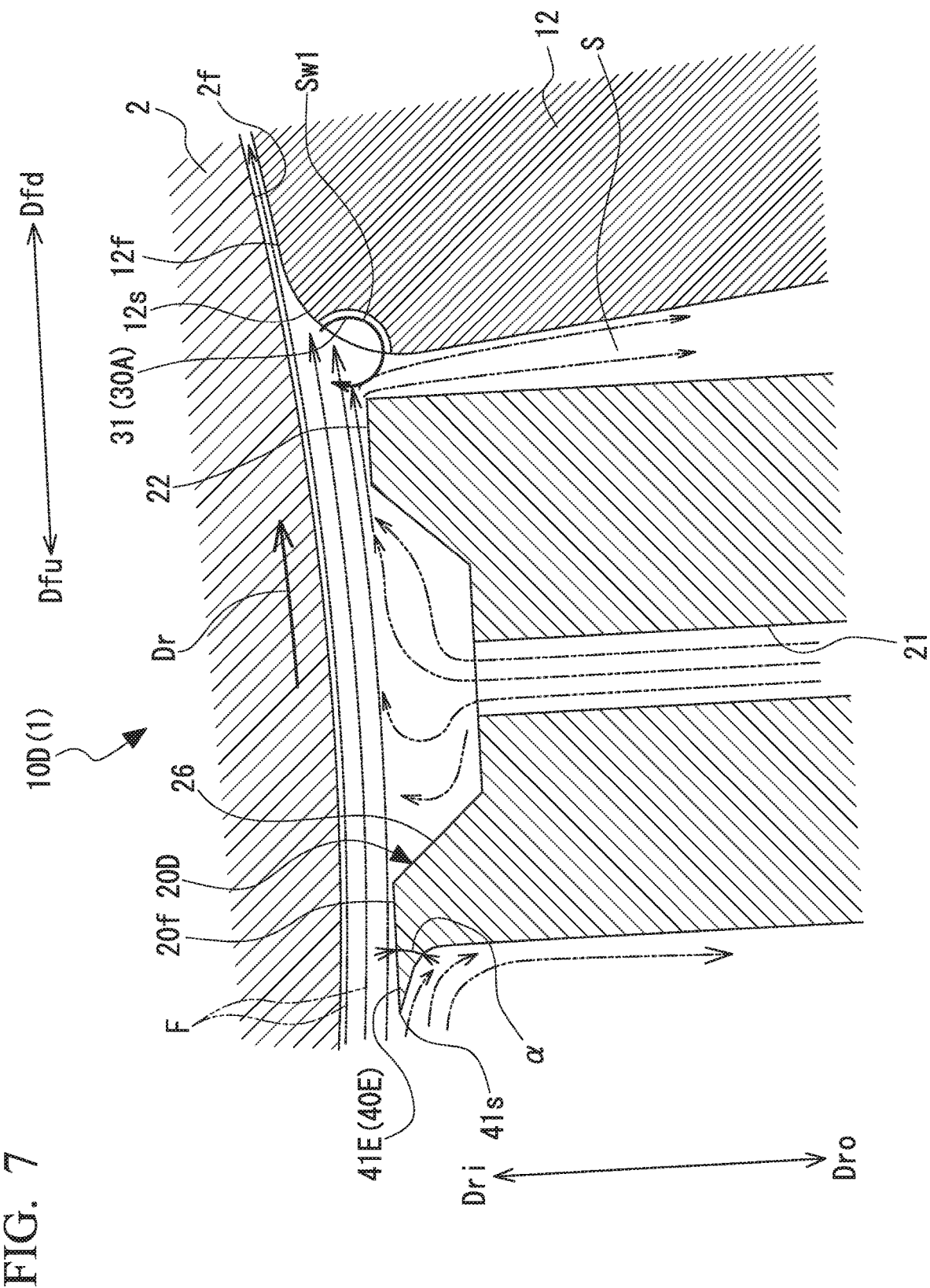
FIG. 7 is a cross-sectional view illustrating the configuration of the pad bearing according to a first modification example of the fourth embodiment of the pad bearing and the rotary machine.

FIG. 7 is a cross-sectional view illustrating the configuration of the pad bearing according to a first modification example of the fourth embodiment of the pad bearing and the rotary machine.

As illustrated in FIG. 7, a protruding portion 41E of a branching guide portion 40E according to this modification example is formed so as to have a radial thickness T1 gradually decreasing from the downstream side Dfd (rear in the rotation direction Dr) toward the upstream side (front in the rotation direction). It is preferable that a tip portion 41s of the protruding portion 41E, which is on the upstream side Dfu, has an acute angle α of 30° or less.

With this configuration, part of the flow F of a lubricant can be efficiently guided to the radially outer side Dro when the lubricant that flows from the upstream side of the nozzle member 20D hits the protruding portion 41E. In addition, disturbance of the flow F of the lubricant hitting the protruding portion 41E can be suppressed by the tip portion 41s of the protruding portion 41D having the acute angle.

Second Modification Example of Fourth Embodiment

Figure 8:
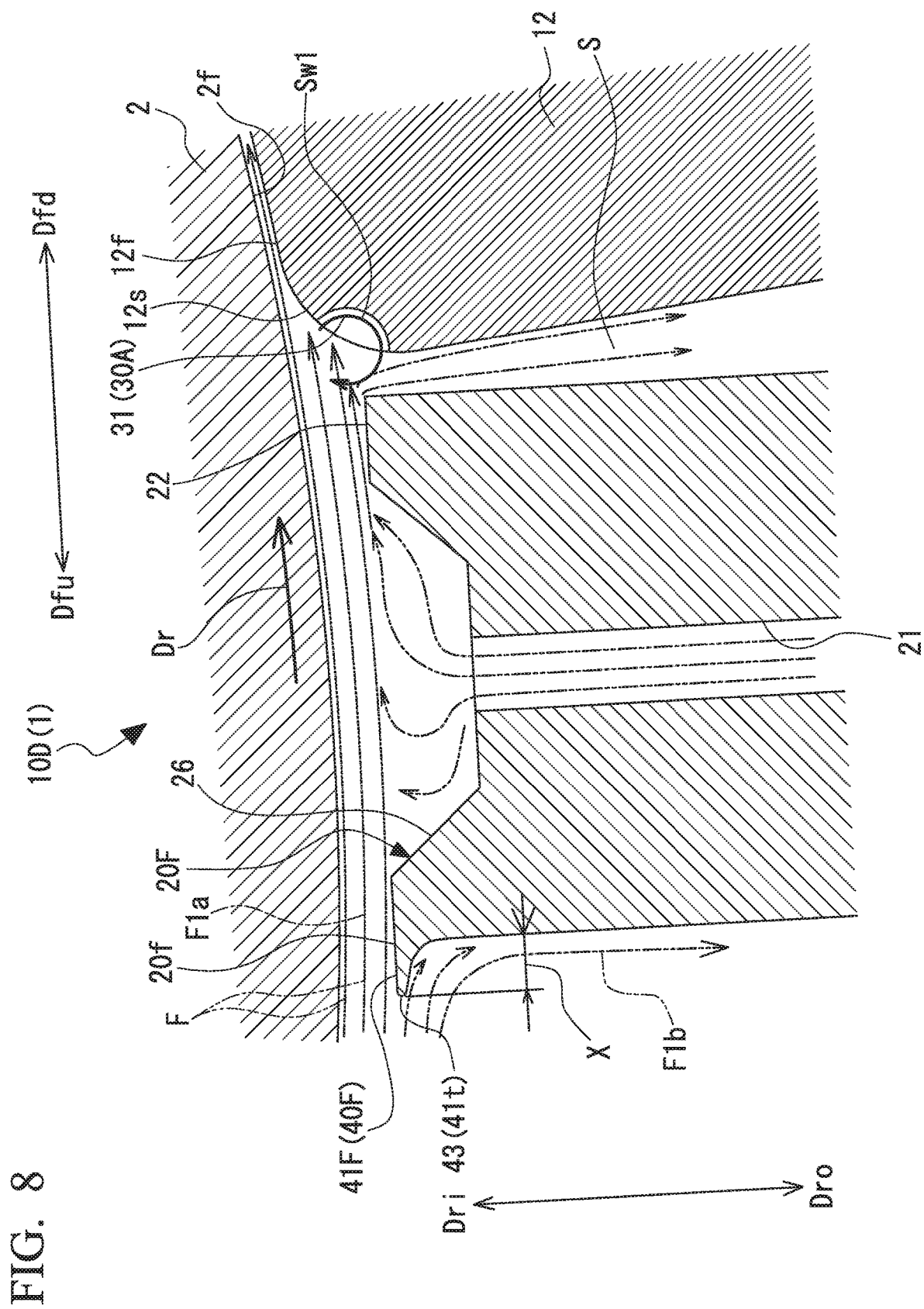
FIG. 8 is a cross-sectional view illustrating the configuration of the pad bearing according to a second modification example of the fourth embodiment of the pad bearing and the rotary machine.

FIG. 8 is a cross-sectional view illustrating the configuration of the pad bearing according to a second modification example of the fourth embodiment of the pad bearing and the rotary machine.

As illustrated in FIG. 8, in a protruding portion 41F of a branching guide portion 40F according to this second modification example, a tip portion 41t on the upstream side Dfu is formed by a circular arc-shaped circular arc surface 43, which has a curvature radius equal to or greater than a predetermined curvature radius.

Here, it is preferable that the curvature radius of the circular arc surface 43 is at least 50% of a protrusion dimension X of the protruding portion 41F that pertains to the protrusion to the upstream side Dfu.

With this configuration, the flow F of a lubricant is allowed to stably branch into a flow F1a flowing into the space between the rotary shaft 2 and the nozzle member 20D and a flow F1b guided to the radially outer side Dro along the nozzle member 20D even in the event of disturbance of the flow F of the lubricant that flows from the upstream side of the nozzle member 20D.

Fifth Embodiment

Next, the pad bearing and the rotary machine according to a fifth embodiment of the present invention will be described. The only difference of the following fifth embodiment from the first embodiment is the configuration of a branching guide portion 40G Accordingly, parts identical to those of the first embodiment are denoted by the same reference numerals so that the same description does not have to be repeated.

Figure 9:
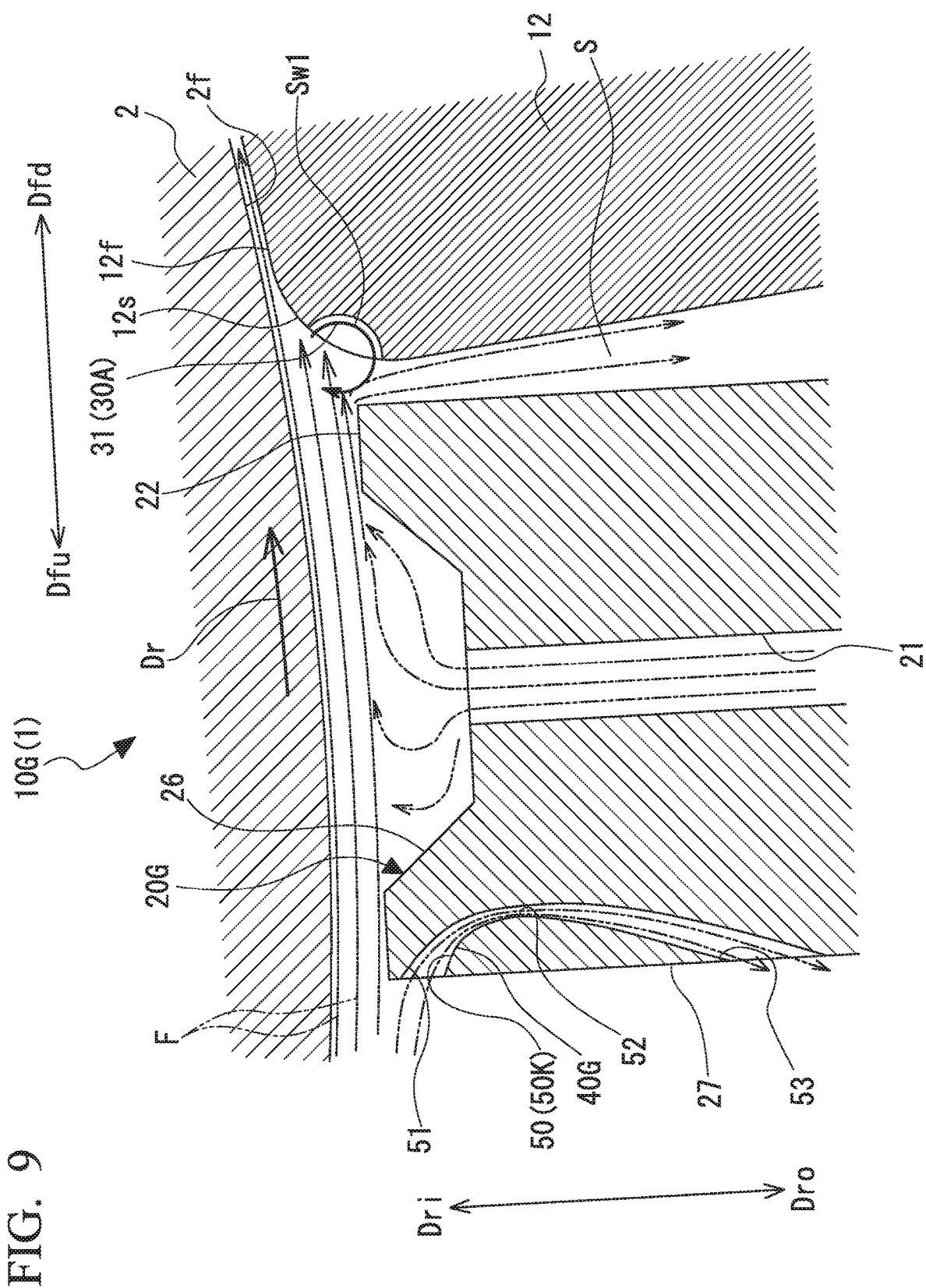
FIG. 9 is a cross-sectional view illustrating the configuration of the pad bearing according to a fifth embodiment of the pad bearing and the rotary machine.

FIG. 9 is a cross-sectional view illustrating the configuration of a pad bearing 10G according to the fifth embodiment of the pad bearing and the rotary machine.

As illustrated in FIG. 9, the rotary machine 1 according to this embodiment is provided with the rotary shaft 2 and the pad bearing 10G that supports the rotary shaft 2 so as to be rotatable around the axis O.

The pad bearing 10G is provided with the annular bearing housing 11 (see FIG. 1), the pad 12, and a nozzle member 20G. Further, the pad bearing 10G is provided with any one of the compressed flow forming units 30A to 30C illustrated in the first to third embodiments described above. In the example that is illustrated in FIG. 9, the pad bearing 10G is provided with the compressed flow forming unit 30A illustrated in the first embodiment. Alternatively, the pad bearing 10G can be a configuration that is not provided with the compressed flow forming units 30A to 30C.

The nozzle member 20G according to this embodiment is provided with the branching guide portion 40G. The branching guide portion 40G is provided on the upstream side Dfu (front in the rotation direction Dr) in the nozzle member 20G The branching guide portion 40G has an inflow hole forming portion 50K forming an inflow hole 50. The inflow hole 50 may be continuously formed in the axis O direction or a plurality of the inflow holes 50 may be formed so as to be spaced apart in the axis O direction.

The inflow hole 50 has an inlet portion 51, a nozzle portion 52, and an outlet portion 53.

The inlet portion 51 is open to an upstream end surface 27 facing the upstream side Dfu in a nozzle member 20F. Part of the flow F of a lubricant that flows along the outer peripheral surface 2f of the rotary shaft 2 as the rotary shaft 2 rotates flows in from the inlet portion 51.

The nozzle portion 52 is formed between the inlet portion 51 and the outlet portion 53. The nozzle portion 52 is smaller in flow path cross-sectional area than the inlet portion 51 and the outlet portion 53.

The outlet portion 53 is formed on the radially outer side Dro with respect to the inlet portion 51. The outlet portion 53 is open to the upstream end surface 27 of the nozzle member 20G.

In this configuration, part of the lubricant that flows from the upstream side of the nozzle member 20G flows into the inflow hole 50 from the inlet portion 51. Since the nozzle portion 52 is smaller in flow path cross-sectional area than the inlet portion 51, the flow velocity of the lubricant that has flowed into the inflow hole 50 from the inlet portion 51 becomes higher in the nozzle portion 52 than in the inlet portion 51. As a result, the pressure of the lubricant becomes lower in the nozzle portion 52 than in the inlet portion 51. Then, part of the lubricant flowing from the upstream side of the nozzle member 20G is suctioned into the inflow hole 50 from the inlet portion 51.

Therefore, according to the fifth embodiment described above, part of the lubricant flowing from the upstream side of the nozzle member 20G flows into the inflow hole 50. The inflow hole 50 has the nozzle portion 52, which is smaller in flow path cross-sectional area than the inlet portion 51, and thus part of the lubricant flowing from the upstream side of the nozzle member 20G is suctioned into the inlet portion 51 of the inflow hole 50. Accordingly, part of the lubricant flowing from the upstream side of the nozzle member 20G can be efficiently guided to the radially outer side Dro. As a result, it is possible to suppress a rise in the temperature of the lubricant that is sent into the space between the pad 12 and the outer peripheral surface 2f of the rotary shaft 2, which is on the downstream side Dfd from the nozzle member 20G Accordingly, it is possible to suppress a decrease in lubricant viscosity, and it is possible to enhance the lubricity between the pad 12 and the rotary shaft 2.

When the compressed flow forming unit 30A is provided as in the first to third embodiments described above, it is possible to compress the flow F of the lubricant that flows along the outer peripheral surface 2f of the rotary shaft 2 as the rotary shaft 2 rotates. As a result, it is possible to enhance the lubricity between the pad 12 and the rotary shaft 2.

Sixth Embodiment

Next, a sixth embodiment of the pad bearing and the rotary machine according to the present invention will be described.

Figure 10:
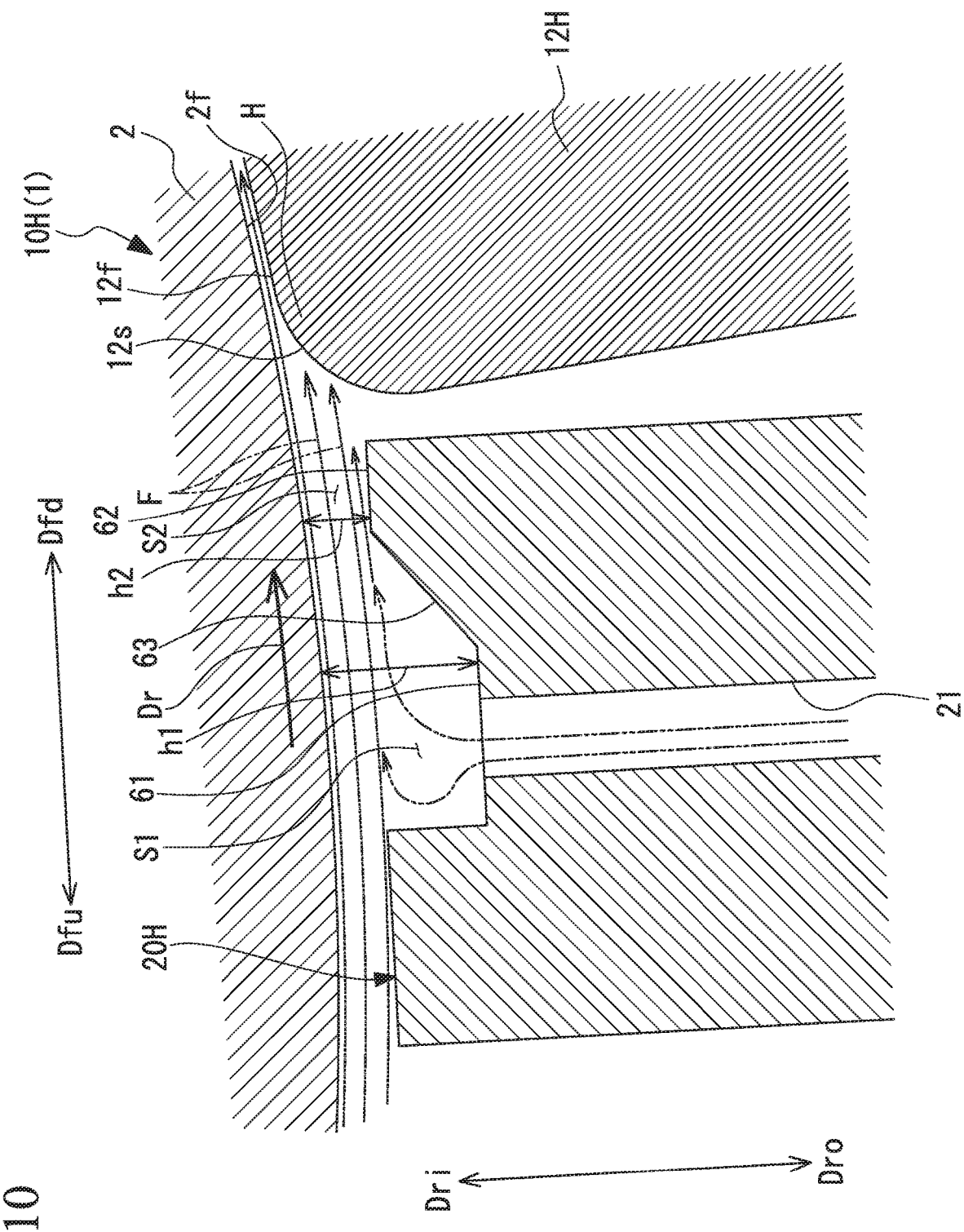
FIG. 10 is a cross-sectional view illustrating the configuration of the pad bearing according to a sixth embodiment of the pad bearing and the rotary machine.

FIG. 10 is a cross-sectional view illustrating the configuration of a pad bearing 10H according to the fifth embodiment of the pad bearing and the rotary machine.

As illustrated in FIGS. 1 and 10, the rotary machine 1 according to this embodiment is provided with the rotary shaft 2 and the pad bearing 10H that supports the rotary shaft 2 so as to be rotatable around the axis O.

The pad bearing 10H is provided with the annular bearing housing 11, a pad 12H, and a nozzle member 20H.

The pad 12H is disposed on the radially outer side of the rotary shaft 2 on the radially inner side of the bearing housing 11. A plurality of the pads 12H are provided in the circumferential direction around the axis O. In this embodiment, two pads 12H are disposed on the lower side in a load direction, that is, an upward-downward direction with respect to the rotary shaft 2. The support member 13 is provided on the inner peripheral surface of the bearing housing 11. Each pad 12H is swingably supported by the support member 13. The pads 12H support the rotary shaft 2 so as to be rotatable around the axis O.

Each pad 12H has a circular arc shape when viewed from the axis O direction of the rotary shaft 2. Each pad 12H has a curved plate shape extending in the same cross-sectional shape in the axis O direction. The curvature radius of the sliding surface 12f of the pad 12H is formed so as to be slightly larger than the curvature radius of the outer peripheral surface 2f of the rotary shaft 2. In other words, the entire surface of the sliding surface 12f of the pad 12H is not in contact with the rotary shaft 2. The sliding surface 12f of the pad 12H can be formed of a soft metal such as a white bearing (babbitt bearing).

As illustrated in FIG. 10, the inclined portion 12s is formed in the front end portion of the sliding surface 12f of the pad 12H in the rotation direction Dr of the rotary shaft 2. The inclined portion 12s is curved so as to be gradually separated from the outer peripheral surface 2f of the rotary shaft 2 to the radially outer side from the sliding surface 12f behind the inclined portion 12s in the rotation direction Dr toward the front in the rotation direction Dr.

The nozzle member 20H is disposed on the upstream side Dfu with respect to the pad 12H on the radially outer side Dro of the rotary shaft 2. The nozzle member 20H is fixed to the bearing housing 11. The nozzle member 20H extends in the axis O direction and has a width equal to the width of the pad 12H in the axis O direction. The nozzle member 20H has a predetermined length in the circumferential direction around the axis O. In addition, the nozzle member 20H protrudes from the inner peripheral surface of the bearing housing 11 toward the radially inner side Dri. As a result, the nozzle member 20H has a substantially rectangular parallelepiped block shape extending in the axis O direction.

The nozzle member 20H has the discharge hole 21 for discharging a lubricant toward the outer peripheral surface 2f of the rotary shaft 2. A plurality of the discharge holes 21 are spaced apart in the axis O direction.

In addition, the nozzle member 20H has a first surface 61 and a second surface 62 facing the outer peripheral surface 2f of the rotary shaft 2 at a distance in the radial direction. The discharge hole 21 is open to the first surface 61. A first clearance S1 is formed between the first surface 61 and the outer peripheral surface 2f of the rotary shaft 2.

The second surface 62 is provided behind the first surface 61 in the rotation direction Dr of the rotary shaft 2. The second surface 62 is provided closer to the radially inner side Dri than the first surface 61. As a result, a second clearance S2, which is smaller than the first clearance S1, is formed between the second surface 62 and the outer peripheral surface 2f of the rotary shaft 2. In the present embodiment, an inclined surface 63 is provided between the first surface 61 and the second surface 62 with a clearance from the outer peripheral surface 2f of the rotary shaft 2 gradually decreasing from the front toward the rear in the rotation direction Dr of the rotary shaft 2.

A lubricant is supplied to the nozzle member 20H from a lubricant supply source (not illustrated). The lubricant is discharged toward the outer peripheral surface 2f of the rotary shaft 2 through the discharge hole 21. The discharged lubricant flows along the outer peripheral surface 2f of the rotary shaft 2 as the rotary shaft 2 rotates. At this time, the already supplied lubricant circulates together and flows along the outer peripheral surface 2f of the rotary shaft 2 as the rotary shaft 2 rotates. The lubricant discharged from the discharge hole 21 joins the flow F of the lubricant circulating together with the rotary shaft 2. The flow F of the lubricant is partially accumulated in the first clearance S1 and the second clearance S2.

When the lubricant is discharged from the discharge hole 21, the air in the bearing housing 11 may be caught in the lubricant. Air bubbles are generated in the lubricant once the air is caught. Once the air bubble-containing lubricant enters the space between the sliding surface 12f of the pad 12 and the outer peripheral surface 2f of the rotary shaft 2, the vibration damping effect of the lubricant in the pad bearing 10H decreases and the support rigidity of the rotary shaft 2 decreases. As a result, the vibration characteristics of the bearing deteriorate and a decline in bearing performance arises.

In the present embodiment, the second clearance S2 between the outer peripheral surface 2f of the rotary shaft 2 and the second surface 62 is smaller than the first clearance S1 between the outer peripheral surface 2f of the rotary shaft 2 and the first surface 61. As a result, once a lubricant flows into the second clearance S2 from the first clearance S1, the lubricant is compressed by the second clearance S2. At this time, the lubricant is gradually compressed from the front toward the rear in the rotation direction Dr by the inclined surface 63 between the first clearance S1 and the second clearance S2. Once the lubricant is compressed in this manner, the air bubbles in the lubricant discharged from the discharge hole 21 are crushed and eliminated. Accordingly, a decline in the vibration damping effect of the lubricant in the pad bearing 10H and a decline in the support rigidity of the rotary shaft 2 are suppressed.

Here, it is preferable that an oil film thickness h1 in the first clearance S1 is set such that h1/h2 is approximately 1.5 to 4 with respect to an oil film thickness h2 in the second clearance S2.

Therefore, according to the sixth embodiment described above, the second clearance S2 between the outer peripheral surface 2f of the rotary shaft 2 and the second surface 62 is smaller than the first clearance S1 between the outer peripheral surface 2f of the rotary shaft 2 and the first surface 61.

As a result, a lubricant flowing toward the rear in the rotation direction Dr is compressed by flowing into the second clearance S2 from the first clearance S1. Accordingly, in a case where air mixes with the lubricant discharged from the discharge hole 21 and air bubbles are generated, the air bubbles can be eliminated. As a result, it is possible to suppress a decline in the vibration damping effect and shaft support rigidity of the bearing attributable to air bubbles mixed during lubrication. Accordingly, the vibration characteristics of the bearing attributable to the lubricant can be enhanced and bearing performance improvement can be achieved.

In the pad bearing 10H, the inclined surface 63 is provided between the first surface 61 and the second surface 62. With this configuration, a lubricant discharged from the discharge hole 21 of the nozzle member 20H toward the outer peripheral surface 2f of the rotary shaft 2 is gradually compressed by the inclined surface 63 when the lubricant flows toward the rear in the rotation direction Dr of the rotary shaft 2 and flows into the second clearance S2 from the first clearance S1. As a result, air bubbles in the lubricant discharged from the discharge hole 21 can be eliminated.

Seventh Embodiment

Next, the pad bearing and the rotary machine according to a seventh embodiment of the present invention will be described. The only difference of the following seventh embodiment from the sixth embodiment is the configurations of a second surface 64 and a step portion forming surface 65. Accordingly, parts identical to those of the sixth embodiment are denoted by the same reference numerals so that the same description does not have to be repeated.

Figure 11:
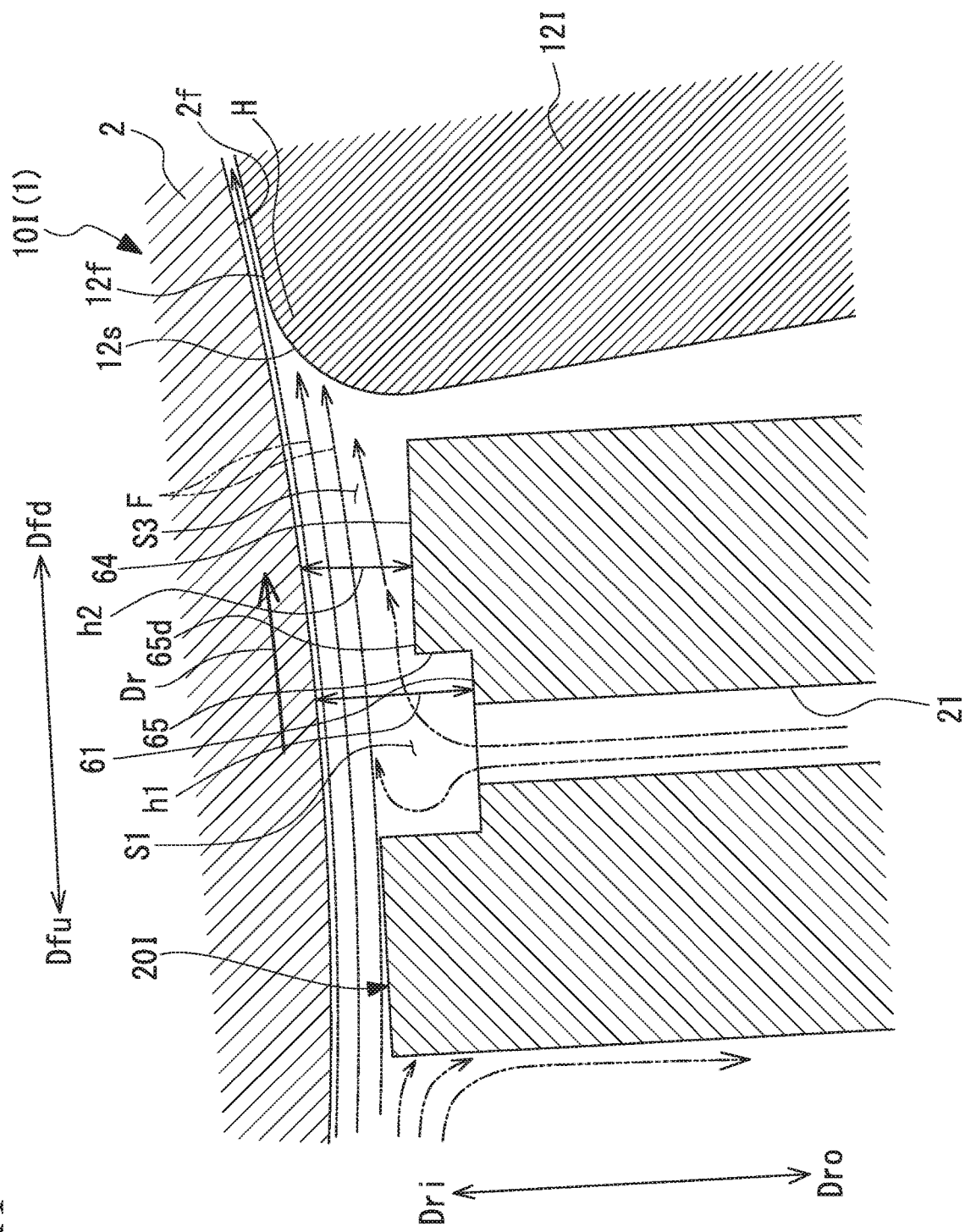
FIG. 11 is a cross-sectional view illustrating the configuration of the pad bearing according to a seventh embodiment of the pad bearing and the rotary machine.

FIG. 11 is a cross-sectional view illustrating the configuration of a pad bearing 10I according to the fifth embodiment of the pad bearing and the rotary machine.

As illustrated in FIGS. 1 and 11, the rotary machine 1 according to this embodiment is provided with the rotary shaft 2 and the pad bearing 10I that supports the rotary shaft 2 so as to be rotatable around the axis O.

The pad bearing 10I is provided with the annular bearing housing 11, a pad 12I, and a nozzle member 20I.

As illustrated in FIG. 11, the nozzle member 20I has the discharge hole 21 for discharging a lubricant toward the outer peripheral surface 2f of the rotary shaft 2. A plurality of the discharge holes 21 are spaced apart in the axis O direction.

In addition, the nozzle member 20I has the first surface 61 and the second surface 64 facing the outer peripheral surface 2f of the rotary shaft 2 at a distance in the radial direction. The discharge hole 21 is open to the first surface 61. The first clearance S1 is formed between the first surface 61 and the outer peripheral surface 2f of the rotary shaft 2.

The second surface 64 is provided behind the first surface 61 in the rotation direction Dr of the rotary shaft 2. The second surface 64 is provided closer to the radially inner side Dri than the first surface 61. As a result, a second clearance S3, which is smaller than the first clearance S1, is formed between the second surface 64 and the outer peripheral surface 2f of the rotary shaft 2. In the present embodiment, the pad bearing 10I is provided with the step portion forming surface 65 extending in the radial direction of the rotary shaft 2 between the first surface 61 and the second surface 64. A step portion 65d is formed between the first surface 61 and the second surface 64 by the step portion forming surface 65.

In this configuration, the second clearance S3 between the outer peripheral surface 2f of the rotary shaft 2 and the second surface 64 is smaller than the first clearance S1 between the outer peripheral surface 2f of the rotary shaft 2 and the first surface 61. As a result, a lubricant discharged from the discharge hole 21 and flowing toward the rear in the rotation direction Dr is compressed by flowing into the second clearance S3 from the first clearance S1. At this time, the lubricant is rapidly compressed in the step portion 65d formed by the step portion forming surface 65 while reaching the second clearance S3 from the first clearance S1. As a result, air bubbles in the lubricant discharged from the discharge hole 21 can be eliminated in a more reliable manner. Accordingly, a decline in the vibration damping effect of the lubricant in the pad bearing 10I and a decline in the support rigidity of the rotary shaft 2 are suppressed.

According to the seventh embodiment described above, the step portion 65d is formed between the first surface 61 and the second surface 64 by the step portion forming surface 65. As a result, a lubricant is compressed when the lubricant flows toward the rear in the rotation direction Dr of the rotary shaft 2 and flows into the second clearance S3 from the first clearance S1. In addition, the lubricant is rapidly compressed in the step portion 65d formed by the step portion forming surface 65. As a result, air bubbles in the lubricant discharged from the discharge hole 21 can be eliminated in a more reliable manner. As a result, it is possible to suppress a decline in the vibration damping effect and shaft support rigidity of the bearing attributable to air bubbles mixed during lubrication. Accordingly, the vibration characteristics of the bearing attributable to the lubricant can be enhanced and bearing performance improvement can be achieved.

The configurations illustrated in the sixth and seventh embodiments may be combined with the configurations illustrated in the first to fifth embodiments.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims

EXPLANATION OF REFERENCES

1 Rotary machine
2 Rotary shaft
2f Outer peripheral surface
10A, 10B, 10C, 10D, 10G, 10H, 10I Pad bearing
11 Bearing housing
12 Pad
12f Sliding surface
12s Inclined portion
13 Support member
14 Pad end surface
20A, 20B, 20C, 20D, 20F, 20G, 20H, 20I Nozzle member
20e End portion
20f End portion
21 Discharge hole
22 Nozzle tip surface (facing surface)
24 Nozzle end surface
26 Nozzle recess portion
27 Upstream end surface
30A, 30B, 30C compressed flow forming unit
31K Recess portion forming portion
31 Recess portion
31e End portion
31f Inner peripheral surface
33, 33B Projection
35 Non-contact seal portion
36, 37, 38 Surface
39A, 39B Seal surface
40D, 40E, 40F, 40G Branching guide portion
41D, 41E, 41F Protruding portion
41s Tip portion
41t Tip portion
43 Circular arc surface
50 Inflow hole
50K Inflow hole forming portion
51 Inlet portion
52 Nozzle portion
53 Outlet portion
61 First surface
62, 64 Second surface
63 Inclined surface
65 Step portion forming surface
65d Step portion
Dfd Downstream side
Dfu Upstream side
Dr Rotation direction
Dri Radially inner side
Dro Radially outer side
G Protrusion height
H Distance
O Axis
P Protrusion dimension
R Curvature radius
R1 Curvature radius
S Clearance
S1 First clearance
S2, S3 Second clearance
Sw1, Sw2 Swirl
Sw3 Swirl
T1 Thickness
X Protrusion dimension
αAngle

What is claimed is:
1. A pad bearing comprising:
a pad disposed on an outer side of a rotary shaft in a radial direction and supporting the rotary shaft so as to be rotatable around an axis;
a block-shaped nozzle member disposed in a front in a rotation direction of the rotary shaft with respect to the pad on the radially outer side of the rotary shaft and including a discharge hole for discharging a lubricant toward an outer peripheral surface of the rotary shaft; and
a compressed flow forming unit disposed in at least one of the pad and the nozzle member and configured to compress a flow of the lubricant flowing along the outer peripheral surface of the rotary shaft as the rotary shaft rotates,
wherein the nozzle member includes:
a first surface forming a first clearance between the outer peripheral surface of the rotary shaft and the first surface with the discharge hole being open to the first surface; and
a second surface provided behind the first surface in the rotation direction of the rotary shaft and forming a second clearance between the outer peripheral surface of the rotary shaft and the second surface, the second clearance being smaller than the first clearance, and wherein an inclined surface is formed only between the first surface and the second surface such that a clearance between the inclined surface and the outer peripheral surface of the rotary shaft decreases from the front toward the rear in the rotation direction of the rotary shaft.

2. A pad bearing comprising:

a pad disposed on an outer side of a rotary shaft in a radial direction and supporting the rotary shaft so as to be rotatable around an axis; and a block-shaped nozzle member disposed in a front in a rotation direction of the rotary shaft with respect to the pad on the radially outer side of the rotary shaft and including a discharge hole for discharging a lubricant toward an outer peripheral surface of the rotary shaft, wherein the nozzle member includes:

a first surface forming a first clearance between the outer peripheral surface of the rotary shaft and the first surface with the discharge hole open to the first surface; and a second surface provided behind the first surface in the rotation direction of the rotary shaft and forming a second clearance smaller than the first clearance between the outer peripheral surface of the rotary shaft and the second surface, and wherein an inclined surface is formed only between the first surface and the second surface such that a clearance between the inclined surface and the outer peripheral surface of the rotary shaft decreases from the front toward the rear in the rotation direction of the rotary shaft.

3. A rotary machine comprising:

a rotary shaft; and a pad bearing which is provided with:

a pad disposed on an outer side of the rotary shaft in a radial direction and supporting the rotary shaft so as to be rotatable around an axis;

a block-shaped nozzle member disposed in a front in a rotation direction of the rotary shaft with respect to the pad on the radially outer side of the rotary shaft and including a discharge hole for discharging a lubricant toward an outer peripheral surface of the rotary shaft and a compressed flow forming unit disposed in at least one of the pad and the nozzle member and configured to compress a flow of the lubricant flowing along the outer peripheral surface of the rotary shaft as the rotary shaft rotates, wherein the nozzle member includes:

a first surface forming a first clearance between the outer peripheral surface of the rotary shaft and the first surface with the discharge hole being open in the first surface; and a second surface provided behind the first surface in the rotation direction of the rotary shaft and forming a second clearance between the outer peripheral surface of the rotary shaft and the second surface, the second clearance being smaller than the first clearance, and wherein an inclined surface is formed only between the first surface and the second surface such that a clearance between the inclined surface and the outer peripheral surface of the rotary shaft decreases from the front toward the rear in the rotation direction of the rotary shaft.

* * * * *